United States Patent
Teoh et al.

(10) Patent No.: US 11,016,549 B2
(45) Date of Patent: May 25, 2021

(54) METHOD, APPARATUS, AND SYSTEM FOR POWER MANAGEMENT ON A CPU DIE VIA CLOCK REQUEST MESSAGING PROTOCOL

(71) Applicant: Intel Corporation, Santa Clara, CA (US)

(72) Inventors: Poh Thiam Teoh, Penang (MY); Mikal C. Hunsaker, El Dorado Hills, CA (US); Su Wei Lim, Penang (MY); Gim Chong Lee, Pulau Pinang (MY); Hooi Kar Loo, Penang (MY); Shashitheren Kerisnan, Penang (MY); Siang Lin Tan, Bayan Lepas (MY); Ming Chew Lee, Pulau Pinang (MY); Ngeok Kuan Wai, Johor (MY); Li Len Lim, Johor (MY)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 15/870,629

(22) Filed: Jan. 12, 2018

(65) Prior Publication Data

US 2019/0041936 A1    Feb. 7, 2019

(51) Int. Cl.
G06F 1/26    (2006.01)
G06F 1/10    (2006.01)
G06F 13/42   (2006.01)

(52) U.S. Cl.
CPC .............. *G06F 1/266* (2013.01); *G06F 1/10* (2013.01); *G06F 13/4282* (2013.01); *G06F 2213/0026* (2013.01)

(58) Field of Classification Search
CPC ........ G06F 1/266; G06F 1/10; G06F 13/4282; G06F 2213/0026
See application file for complete search history.

(56) References Cited

U.S. PATENT DOCUMENTS

| | | | |
|---|---|---|---|
| 2014/0195835 A1* | 7/2014 | E. .......................... | G06F 1/3253 713/323 |
| 2014/0208126 A1* | 7/2014 | Mooney .................. | G06F 1/266 713/300 |
| 2017/0185550 A1 | 6/2017 | Chellappan et al. | |

OTHER PUBLICATIONS

Intel Corp./Hewlett-Packard Company L1 PM Substates with CLKREQ, Revision 1.0a, https://pcisig.com/sites/default/files/specification_documents/ECN_L1_PM_Substates_with_CLKREQ_31_May_2013_Rev10a.pdf, May 31, 2013, 33 pages.

(Continued)

*Primary Examiner* — Stefan Stoynov
(74) *Attorney, Agent, or Firm* — Alliance IP, LLC

(57) ABSTRACT

Aspects of the embodiments are directed to systems, methods, and apparatuses for controlling power management states using a clock request message across a 3.3 volt GPIO pin. Systems can include a CPU root port to transmit to a platform controller hub (PCH) compliant with a PCIe protocol, a first clock request message, the first clock request message comprising a first bit set to assert a clock request transmit (CLKREQ TX assert) on a 3.3 volt general purpose input/output (GPIO) pin local to the PCH; detect that a connected device is entering into a power management state; and transmit, from the CPU root port, to the PCH, a second clock request message, the second clock request message comprising the first bit set to deassert the clock request transmit (CLKREQ TX deassert) and a second bit to assert a clock request protocol (CLKREQ#) on a 3.3 volt GPIO pin.

25 Claims, 15 Drawing Sheets

(56) References Cited

OTHER PUBLICATIONS

Landsman, D. et al., "Power-up requirements for PCIe side bands", https://pcisig.com/sites/default/files/specification_documents/MiniEx_M2_ECR_PERST_CLKREQ_Power-up-Reqts_20140918_Final.pdf, PCI Express M.2 Specification, Revision 1.0, Sep. 18, 2014, 6 pages.

SNullp, "PE4x series: understanding CLKREQ# and PERST# delay", https://www.techinfemo.com/index.php?/forums/topic/8350-pe4x-series-understanding-clkreq-and-perst-delay/, Tech Inferno, Aug. 15, 2015, 3 pages.

\* cited by examiner

METHOD, APPARATUS, AND SYSTEM FOR POWER MANAGEMENT ON A CPU DIE VIA CLOCK REQUEST MESSAGING PROTOCOL

FIELD

This disclosure pertains to computing system, and in particular (but not exclusively) to power management for computing systems.

BACKGROUND

Platform controller hubs (PCHs) represent a family of microchips. Input/output (I/O) functions have been reassigned between a new central hub and the central processing unit (CPU). Certain Northbridge functions, the memory controller, and Peripheral Component Interconnect Express (PCIe) lanes have been integrated into the CPU, while the PCH has taken over the remaining functions. As is the case with most processor environments, their Idle Power should be minimized to meet certain requirements. In many cases, there can be multiple high-speed Serial input/output (I/O) ports (including the universal serial bus (USB)) to accommodate.

A CPU can include a PCIe root port Controller for controlling interconnect transactions through a root complex. The root complex generates transaction requests on behalf of the processor, which is interconnected through a local bus. Root complex functionality may be implemented as a discrete device, or may be integrated with the processor. A root complex may contain more than one PCIe port and multiple switch devices can be connected to ports on the root complex or cascaded.

DETAILED DESCRIPTION

Figure 1:
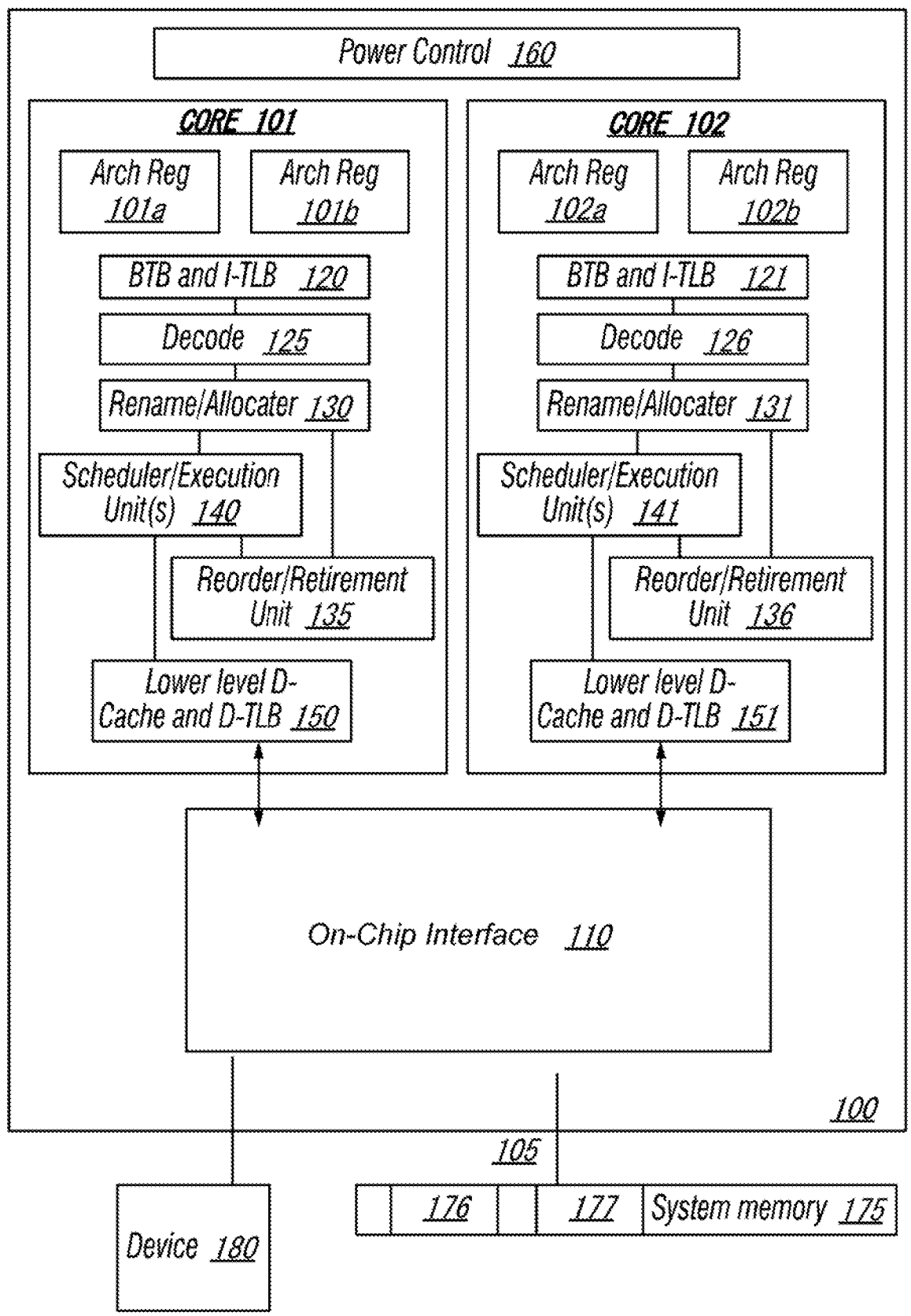
FIG. 1 is a schematic diagram of an example computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SoC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core or core processor often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SoC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SoC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

A drawback of integrating a PCIe root port on a CPU die is that the CPU might not be able enter various idle states (i.e., Cx states) with VNN removal support if an attached device is unable to enter a low power or idle state. Among the limiting factors that prevent these power-saving features to be supported in CPU root ports are: 1) a lack of 3.3V GPIO pins at CPU die. (It is a PCIe Specification requirement that CLKREQ# GPIO pins needs to be 3.3V.) And 2) the reference clock supply for PCIe attached devices is located at Integrated Clock Chip (ICC) phase-locked loop (PLL) at Platform Controller Hub (PCH). Aspects of the embodiments are directed to facilitating a Central Processing Unit (CPU) PCIe root port Controller (PEG) to support power management features using CLKREQ# general purpose input/output (GPIO) pins, such as L1 sub-state and Dynamic Hot Plug Power Management. Aspects of the embodiments can bridge the gap of these two limitations by providing communication channel between CPU and PCH to communicate and handshaking CLKREQ# GPIO pin control.

The Clock Request (CLKREQ) Messaging Protocol permits autonomous power management, such as the L1 sub-state, to be supported in the CPU die. With the CLKREQ messaging protocol, the CPU can enter deeper idle (Cx) states and perform VNN removal, as well as permit the platform to enter various sleep states with the reference clock gated. The CLKREQ# signal is an open drain, active low signal that is driven low by, e.g., a PCIe M.2 device add-in card function to request that the PCIe reference clock be available (active clock state) in order to allow the PCIe interface to send/receive data across an interconnect.

The features described herein can improve better battery life and also shortening power management exit latency.

Figure 2:
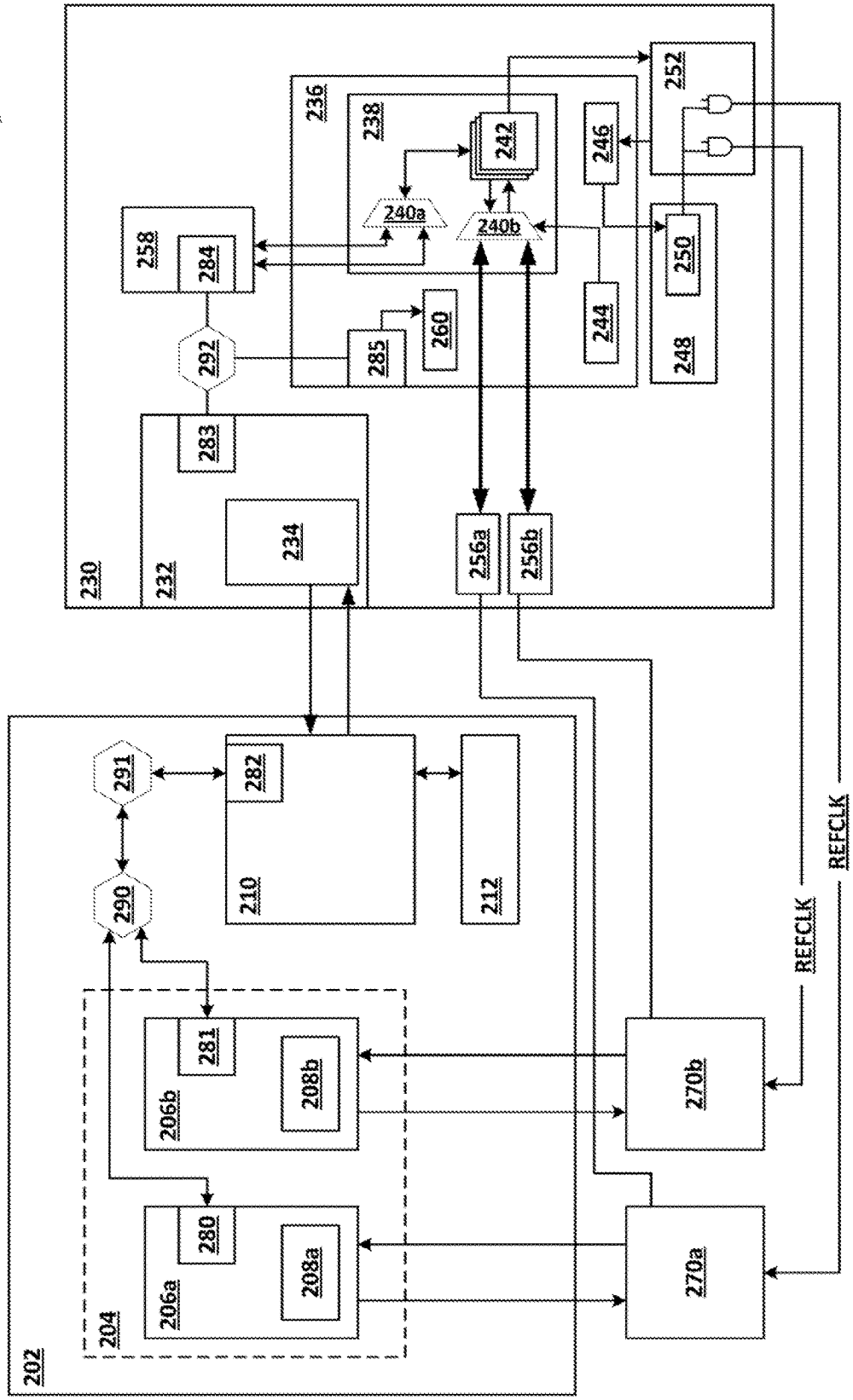
FIG. 2 is a schematic diagram of an example computing system that includes a central processing unit coupled to a platform controller hub in accordance with embodiments of the present disclosure.

FIG. 2 is a schematic diagram of an example computing system 200 that includes a central processing unit (CPU) system on chip (SoC) 202 coupled to a platform controller hub PCH SoC 230 in accordance with embodiments of the present disclosure. The CPU SoC 202 can be a hardware system that includes multiple hardware and software functional blocks. For example, the CPU SoC 202 can include a root port controller 204. The root port controller 204 can include a first root port 206a and a second root port 206b, as well as other root ports depending on implementation. The number of root ports can be smaller or larger while still being within the scope of this disclosure.

The root ports 206a or 206b (or the root port controller 204) can initiate the CLKREQ# messaging protocol, can terminate the CLKREQ# messaging protocol, and can be the consumer of the CLKREQ# messaging protocol for power management. The root ports 206a and 206b can include fabric sideband interfaces 280 and 281, respectively. The root ports 206a and 206b can be coupled to a sideband bridge 210 through sideband routers (SB routers) 290a and 290b via a fabric sideband interface 282. The sideband bridge 210 is a hardware element that implements software and/or firmware to send and receive CLKREQ# messaging packets from PCH SoC 230.

The sideband bridge 210 can interface with P-unit 212. P-unit 210 is a hardware agent managed by a software agent, such as a power management (PM) driver. The P-unit 210 may manage the CPU SoC 202 power requests and acknowledgement signals exchanged between the CPU SoC 202 and the PCH SoC 230. The PM driver may manage power flow among the components of the CPU SoC 202 according to one or more power policies.

The sideband bridge 232 send and receive the CLKREQ# messaging packets from the CPU SoC 202. The sideband bridge 232 can be coupled to a virtual wire message (VWM) logic 258 that can convert a wire signal/message into a virtual wire message according to a virtual wire message protocol. The VWM logic 258 can be coupled into a PCIe CLKREQ controller 238 in the FIA 236 via a multiplexer element 240a. A second multiplexer element 240b can be coupled to the CLKREQ# GPIO 256a and 256b to control the signaling to the attached devices 270a and 270b. The multiplexer 240b can receive information from one or more CLKREQ# control protocols 242, each of which can also inform the ICC 252 with appropriate clocking protocols. A CLKREQ# mapping register 244 can be coupled to the multiplexer 240b to provide CLKREQ# bit set information to allow the FIA 236 to parse CLKREQ# messaging signals. A generic register 260 can be coupled to the IOSF 285.

An integrated clock chip (ICC) 252 can be coupled to a phase locked loop (PLL) 246 that is coupled to a 100 MHz PLL 250 that is part of a physical layer common lane 248 that provides a reference clock signal to the ICC 252.

The sideband bridge 210 can be coupled to the PCH SoC 230 via a power management controller (PMC) 232. The PMC 232 can also include a sideband bridge 234 to interface with the sideband bridge 210 of the CPU SoC 202. The PMC 232 can communicate with the flexible IO adaptor (FIA) 236 through a SB router 292 (via fabric sideband interface 283 and 285). The FIA 236 can include a PCIe CLKREQ controller 238. The FIA 236 can communicate with integrated clock chip (ICC) 252 and the CLKREQ# GPIO 256a and 256b. The CLKREQ# GPIO 256a and 256b can be used as an IO to the connected devices 270a and 270b, and can sample the state of the CLKREQ# pin and drive the wire state to FIA 236. The ICC 252 can generate a reference Clock (REFCLK#) to the PCIe Devices 270a and/or 270b. The FIA 236 can also communicate with the VWM logic 258 based on CLKREQ# messaging protocol described below. The FIA 236 can perform the CLKREQ# pin multiplexing to the correct PCIe root port in CPU SoC 202.

Aspects of the CLKREQ# message protocol described herein use the 3.3 v General Purpose Input/Output (GPIO) pin (shown as GPIO pins 256a and 256b in FIG. 2) located at the PCH system on chip (SoC) 230 as the CLKREQ# single or bi-directional GPIO pin for PCIe root ports 206a and 206b located at the CPU SoC 202. The CLKREQ# GPIO pin 256a and 256b will be connected to ICC at PCH SoC, so that device can request for reference clock supply/gate through CLKREQ# assertion/deassertion respectively. Asserting a pin means setting it to its active state. Deasserting a pin means setting the pin to an inactive state. A CLKREQ# message can be converted to CLKREQ# Message Protocol on fabric sideband interfaces (e.g., IOSF 281, 282, 283) as sideband messages, and routed through sideband bridges 232 and 210 to CPU PCIe root ports 206a and 206b. CPU PCIe root ports 206a and 206b can consume the CLKREQ# messages as virtual CLKREQ# GPIO pin, to bring the PCIe link to its respective power management state, such as Active State L1 Sub-state Power Management State. Table 1 below shows the power management features associated with CLKREQ# pins.

TABLE 1

Power Management State Supported by CPU PCIe root port

| PCIe root port Power Management State | Require bidirectional CLKREQ#? | Supported by CNL CPU PCIe root port? | Supported by ICL CPU PCIe root port? |
| --- | --- | --- | --- |
| L1.1 | Yes | No | Supported |
| L1.2 | Yes | No | Supported |
| L1 Standard with Clock Request Pins Power Management | No | No | Supported |
| Detect State Power Management | No | No | Supported |

CLKREQ# Messaging Protocol:

This disclosure describes 4 types of CLKREQ# Messaging Protocol to support various Power Management States, as shown in the Table 2. Those messaging protocols are "Clock Request Sample Protocol," "No Sample Clock Request Protocol," "Clock Request L1.1 Sample Protocol," and "Clock Request L1.2 Sample Protocol".

TABLE 2

CLKREQ# Messaging Protocol Mapping to LTSSM State Power Management Support

| LTSSM States | Usages | Clock Req Messages Protocol |
| --- | --- | --- |
| Detect | Clock Request De-assertion to support power management | Clock Request Sample Protocol |
| L1.0 | No Sample Clock Request For L1.0 | No Sample Clock Request Protocol |
| L1.0 | Clock Request De-assertion to turn perform power management | Clock Request Sample Protocol |
| L1.1 | Clock Request De-assertion to enter L1 Substate | Clock Request L1.1 Sample Protocol |
| L1.2 | Clock Request De-assertion to enter L1 Substate | Clock Request L1.2 Sample Protocol |
| L23 | No Sample Clock Request For L23 | No Sample Clock Request Protocol |
| Disable | No Sample Clock Request For Disable | No Sample Clock Request Protocol |

Clock Request Sample Protocol is defined for usages where CLKREQ# is used as input to Link Training Status States Machine (LTSSM) 208a and 208b, e.g., so that respective states of LTSSM 208a and 208b can perform power management based on CLKREQ# pins input.

CLKREQ Messages Format:

Tables below shows the CPU to PCH as well as PCH to CPU CLKREQ# Message Protocol messages. For example, Table 3 provides clock request messages exchanged from the CPU SoC 202 to the PCH SoC 230.

TABLE 3

Clock Request Messages From CPU to PCH

| Virtual Wire Message Bits | Field Name | Field Definitions |
| --- | --- | --- |
| [1:0] | Tpower_on Scale (TPOS) | 00b: 2us<br>01b: 10us<br>10b: 100us<br>11b: Reserved |
| [6:2] | Power On Wait Time (POWT) | The total of Tpower_on in the multiplication of TPOS field × POWT field. Value range from 0 to 31 |
| [7] | Spare | Spare Virtual Wire Pin |
| [8] | CLKREQ TX Control Assert/Deassert | Presents the Active High CLKREQ transmit value. If "1" CLKREQ# Transmit Buffer is enabled, else if "0" CLKREQ# Transmit Buffer is Disable. |
| [9] | Start/End L1.2 Protocol | Represents the CPU PCIe L1.2 Protocol window. Any L1.2 Entry or Exit flow must happen inside the Start/End L1.2 Protocol window. |
| [10] | Start/End L1.1 Protocol | Represents the CPU PCIe L1.1 Protocol window. Any L1.1 Entry or Exit flow must happen inside the Start/End L1.1 Protocol window. |
| [11] | Start/End CLKREQ# Sample Protocol | Represents the CPU PCIe CLKREQ# Sample Protocol window. |
| [12] | Start/End CLKREQ# No Sample Protocol | In this window, CLKREQ TX Control is Deasserted, but FIA must not advertise the change in state of CLKREQ RX. In other words, since CLKREQ RX is already suppressed to Assert "0" prior to start. FIA should continue to clamp it to Assert "0" on receiving Start CLKREQ# Sample. |
| [15:13] | Spare | Spare Virtual Wire Pin |

Clock request messages from CPU PCIe root port 206a and 206b to PCH PCIe root port use to communicate the start of entering to power management state, so that PCH FIA knows which version of clock request handshaking to arm on CLKREQ# GPIO pins. "T power on Scale" and "Power On Wait Timer" use to communicate the power on wake latency that required to be count by PCH FIA upon CLKREQ# assert. This latency only required for L1.2 protocol, and PCH FIA only required to arm the T Power On timer on L1.2 CLKREQ# sample to assert.

"CLKREQ TX Control Assert/Deassert" is use to communicate to PCH FIA on whether to assert or deassert the CLKREQ# GPIO pin. Since the GPIO pin is bi-directional control, and the GPIO pin is weak pull up on board, by instructing PCH FIA to assert the CLKREQ# GPIO pin will prevent device from entering power management state, as the CLKREQ# GPIO pin being hold off by PCH FIA. By instructing PCH FIA to deassert the CLKREQ# GPIO pin, FIA will control the GPIO pin to tristate mode, hence allow the device overtake to deassert the CLKREQ# pin when required.

"Start/End L1.2 Protocol," "Start/End L1.1 Protocol," "Start/End CLKREQ# Sample Protocol" and "Start/End CLKREQ# No Sample Protocol" is to communicate with PCH FIA on which protocol to use and to start/end the respective clock request messages protocol.

TABLE 4

Clock Request Messages From PCH To CPU

| Virtual Wire Message Bits | Field Name | Field Definitions |
|---|---|---|
| [0] | CLKREQ# RX State Assert_b/ Deassert_b | Represents the Active Low CLKREQ# Receive value. If "1," CLKREQ# Pin is De-assert inactive, else if "0," CLKREQ# Pin is Asserted active. |
| [1] | Wake Allowed | Represents the Wake indication for CPU PCIe to exit from the Local Power Gated State and enable the Transmitter Common Mode in L1.2. Assert to "1" on Power On Timer expiry provided CPU PCIe CLKREQ TX = Assert. De-asserts to "0" on CPU PCIe CLKREQ TX = De-asserts Or L1.2 End. |
| [2] | Start/End Protocol ACK | Represents the Acknowledgement of Start/End <L1.2, L1.1, Sample & No Sample> Protocol. Direct reflection of any of Start/End <L1.2, L1.1, Sample & No Sample> Protocol wire state. |
| [7:4] | Spare | Spare Virtual Wire Pin |

Clock message from PCH to CPU mainly to communicate the CLKREQ# GPIO pin status. The status is communicate through "CLKREQ# RX State Assert_b/Deassert_b" bit in clock request messages. The message will reflect the CLKREQ# GPIO pin at that particular time when the clock request messages is response. "Wake Allowed" bit is to indicate completion of T power on counter expire, and this will only be use for L1.2 clock request message protocol. "Start/End Protocol ACK" bit serve as acknowledgement response to Start/End Protocol request from CPU PCIe root port.

Figure 3:
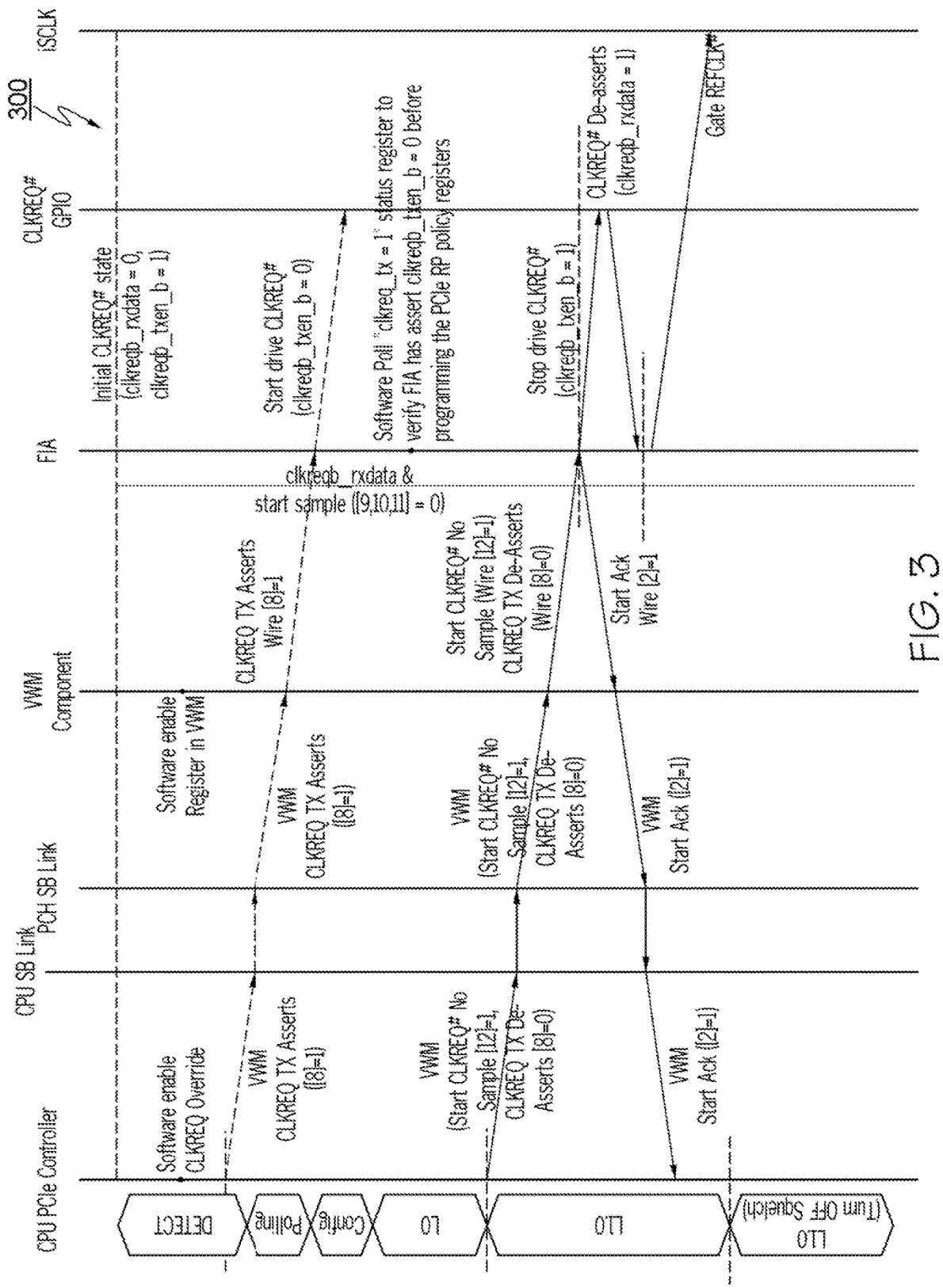
FIG. 3 is a swim lane diagram for an example no sample clock request protocol entry condition in accordance with embodiments of the present disclosure.

FIG. 3 is a swim lane diagram 300 for an example no sample clock request protocol entry condition in accordance with embodiments of the present disclosure. The No Sample Clock Request Protocol is defined for usages where CLKREQ# is not required to be monitored by PCIe root port LTSSM in order to perform power management. This protocol allows the PCH ICC to monitor CLKREQ# pins to turn off a PCLK supply to a device when device deasserts the CLKREQ#. The CLKREQ# assertion or deassertion will not be communicated to CPU PCIe root port, as CPU PCIe root port does not need the CLKREQ# pins to perform power management. One example usage is when link is in L23 state where power management feature can be turned on without monitoring the CLKREQ# messages. This will also permit the sideband bridge to go idle and hence enter its own power management states.

FIG. 3 shows the No Sample Clock Request Protocol entry process flow. When the PCH FIA had booted from cold boot, PCH FIA will assert the CLKREQ# GPIO pin on behalf of CPU PCIe root port. This is to prevent unnecessary race conditions from occurring while the CPU PCIe root port is not ready to accept clock request messages. When the CPU PCIe root port is first booted up from a cold boot, as soon as LTSSM starts being active in a Detect State, the CPU PCIe root port will send a clock request messages with "CLKREQ TX Control Assert/Deassert" bit set to assert. The clock request can send to the PCH FIA via sideband link that links the CPU and PCH Sideband Networks. Since the PCH FIA had already asserted the CLKREQ# GPIO pin, receiving of clock request messages from northbridge with "CLKREQ TX Control Assert/Deassert" bit set to assert, serves as handshaking to acknowledge FIA that CPU PCIe root port is ready to receive clock request messages.

When the system or attached devices enter a power management state where clock request sampling is not required, the CPU PCIe root port will then send a clock request message with the "Start/End CLKREQ# No Sample Protocol" bit set to assert and with the "CLKREQ TX Control Assert/Deassert" bit set to deassert. The PCH FIA upon receiving the message can first acknowledge the clock request messages with "Start/End Protocol ACK" bit set to assert. The PCH FIA will then stop communicating any status of CLKREQ# GPIO pins to CPU PCIe root port since the CPU PCIe Root port does not require such information to perform power management. By not sending messages over the sideband bridge to the CPU, sideband bridge can perform power management, which permits platform power management to take place.

The PCH FIA can also deassert the CLKREQ# GPIO pins when the PCH FIA receives clock request messages of "CLKREQ TX Control Assert/Deassert" bit set to deassert. The CLKREQ# GPIO pin deassert permits the attached device to also deassert the CLKREQ# GPIO pin when the reference clock is not required. When the device drops the CLKREQ# GPIO pin, the ICC can then turn off the reference clock to device, and hence permit platform to enter to S0ix states.

Figure 4:
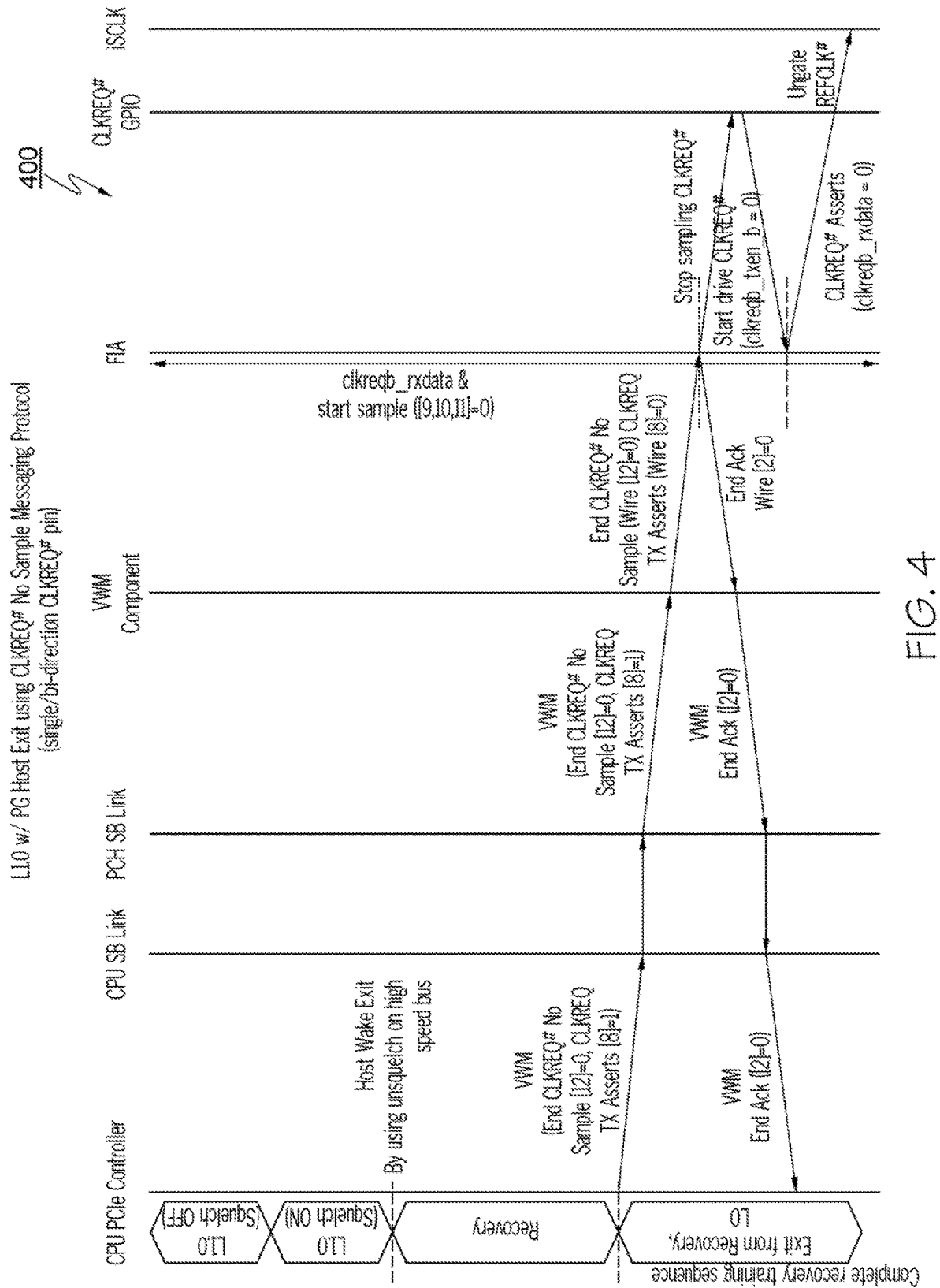
FIG. 4 is a swim lane diagram for an example no sample clock request protocol exit condition in accordance with embodiments of the present disclosure.

FIG. 4 is a swim lane diagram 400 for an example no sample clock request protocol exit condition in accordance with embodiments of the present disclosure. Since the CPU PCIe root port does not need to rely on CLKREQ# GPIO pin to wake the PCIe link, the CPU PCIe root port can then wake up independently to CLKREQ# GPIO pin. The CPU PCIe root port upon awakening from a low power management state can send clock request messages (i.e., messages compliant with the protocol described herein) to the PCH FIA with "Start/End CLKREQ# No Sample Protocol" bit set to deassert and with "CLKREQ TX Control Assert/Deassert" bit set to assert. After the PCH FIA receives the clock request messages, the PCH FIA can then proceed with asserting CLKREQ# GPIO pin, and at the same time return clock request messages with "Start End Protocol ACK" set to deassert. This will then terminate the No Sample Clock Request Protocol communication between the CPU PCIe root port with the PCH FIA.

Figure 5:
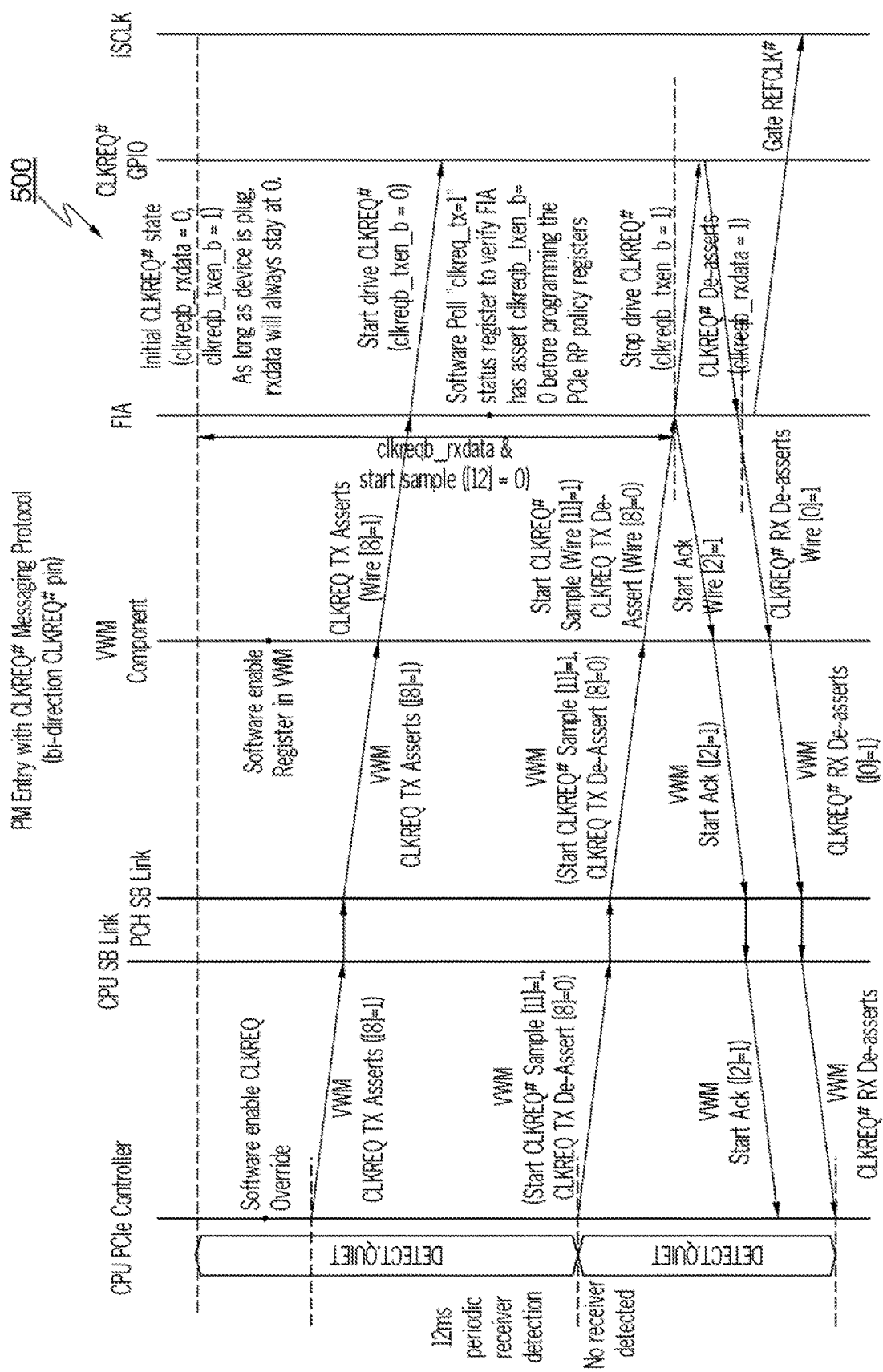
FIG. 5 is a swim lane diagram for a sample clock request protocol entry condition in accordance with embodiments of the present disclosure.

FIG. 5 is a swim lane diagram 500 for a sample clock request protocol entry condition in accordance with embodiments of the present disclosure. The Clock Request Sample Protocol is defined for embodiments of an active state power management other than L1.1 and L1.2, or other states that rely on CLKREQ# GPIO pin to perform power management. When CLKREQ Sample Protocol feature is enabled during instances when the CPU PCIe root ports are in respective low power states, such as L1.0 state, CPU PCIe root port required to send clock request messages to PCH FIA with "Start/End CLKREQ# Sample Protocol" bit set to assert. The PCH FIA can then monitor CLKREQ# GPIO pin and communicate the GPIO pin status back to CPU PCIe.

FIG. 5 shows the "CLKREQ Sample Protocol" process flow for an example power management states, which is Detect State for Hot Plug/Hot Unplug power management support. The PCH FIA can assert CLKREQ# GPIO during a cold boot, and CPU PCIe root port can send clock request messages with "CLKREQ TX Control Assert/Deassert" bit set to assert when CPU PCIe root port is powered up from a cold boot. When the CPU PCIe root port has reached a desired LTSSM state(s), the CPU PCIe root port can begin the "CLKREQ Sample Protocol" by sending clock request message of "Start/End CLKREQ# Sample Protocol" set to assert. At the same time, the CPU PCIe root port can clear the "CLKREQ TX Control Assert/Deassert" bit to deassert. The PCH FIA will then respond with a clock request message of "Start/End Protocol ACK" bit set to assert. The PCH FIA can return the clock request message of "Start/End Protocol ACK," and can also return a "CLKREQ# RX State Assert_b/Deassert_b" status to the CPU PCIe root port. If CLKREQ# GPIO pin is in a deassert state during "CLKREQ# RX State Assert_b/Deassert_b" received, the CPU PCIe root port can then proceed with IP power management. If the CLKREQ# GPIO pin is not in a deassert state (e.g., deasserted by an attached device), the PCH FIA can continue to monitor the CLKREQ# GPIO pin, and can send another clock request messages with "CLKREQ# RX State Assert_b/Deassert_b" to deassert when the CLKREQ# GPIO pin is deasserted.

Figure 6:
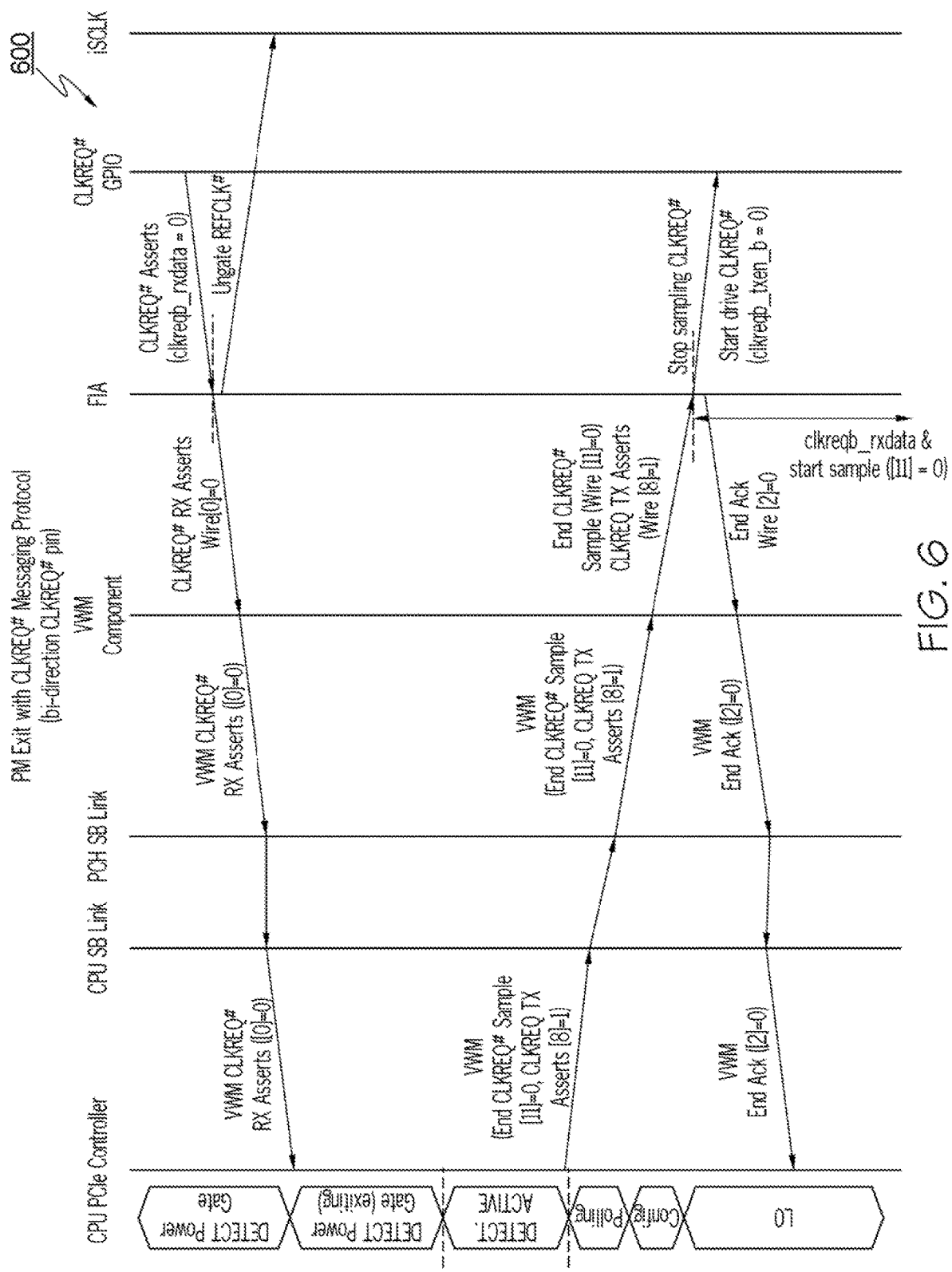
FIG. 6 is a swim lane diagram for a sample clock request protocol exit condition in accordance with embodiments of the present disclosure.

FIG. 6 is a swim lane diagram 600 for a sample clock request protocol exit condition in accordance with embodiments of the present disclosure. Since the CLKREQ# GPIO pin is used for achieving power management, a CLKREQ# assertion can be used to wake the CPU PCIe root port from power management state. When the CLKREQ# GPIO pin is asserted, the PCH FIA can communicate to the CPU PCIe root port by sending clock request message "CLKREQ# RX State Assert_b/Deassert_b" to assert, and at the same time can suppress the CLKREQ# GPIO pin from asserting to prevent an attached device from further entering to low power management state. The CPU PCIe root port, upon receiving the clock request messages, can then bring the link exit from low power management states. The CPU PCIe root port can then respond with "Start/End CLKREQ# Sample Protocol" to deassert, and at the same time can set "CLKREQ TX Control Assert/Deassert" to assert. The PCH FIA, upon receiving the message of End protocol, can then acknowledge the message received by returning clock request message with "Start/End Protocol ACK" deassert.

Figure 7:
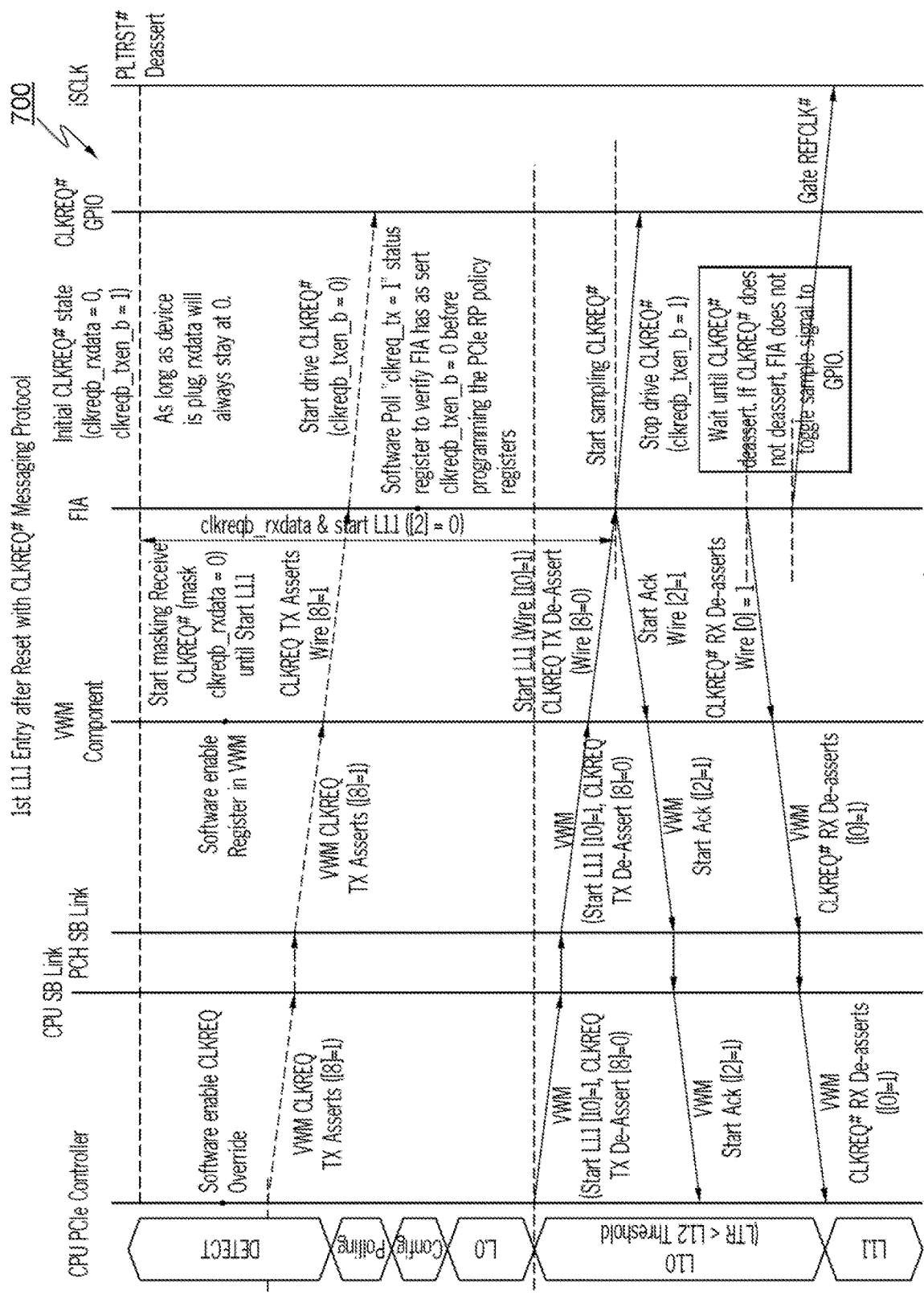
FIG. 7 is a swim lane diagram for a sample clock request protocol entry condition for an L1.1 sub-state in accordance with embodiments of the present disclosure.

FIG. 7 is a swim lane diagram 700 for a sample clock request protocol entry condition for an L1.1 sub-state in accordance with embodiments of the present disclosure. The Clock Request L1.1 Sample Protocol is used for L1.1 power management states whereby the CLKREQ# GPIO pin uses a bi-directional control. This bi-directional control permits the PCIe root port to wake up an attached device via CLKREQ# GPIO pin assertion. At the same time, the CLKREQ# GPIO pin can also be communicated to the ICC to turn off the reference clock to device.

FIG. 7 shows the L1.1 CLKREQ# Sample Protocol Entry Condition process flow. When the CPU PCIe root port had entered to L1.0 state, and CPU PCIe root port is aware of supporting the L1 sub-state, the CPU PCIe root port can initiate a clock request message to the PCH FIA with the "Start/End L1.1 Protocol" bit set to assert and the "CLKREQ TX Control Assert/Deassert" set to deassert. This will permit PCH FIA to switch to L1.1 CLKREQ# Sample Protocol control, and at the same time deassert CLKREQ# GPIO pin. During this time, the CPU PCIe root port is still in L1.0 state. When an attached PCIe device is ready to enter L1.1 state, the PCIe device will then deassert the CLKREQ# GPIO pin, and PCH FIA can detect the deassertion of CLKREQ# GPIO pin. The PCH FIA can then convert the GPIO pin information to a clock request message by setting "CLKREQ# RX State Assert_b/Deassert_b" to deassert. When CPU PCIe root port receives the clock request message(s), the CPU PCIe root port can then transition to L1.1 sub-state and perform power management. While PCH FIA is sending the clock request messages, the CLKREQ# GPIO pin will also be observed by the ICC, and therefore the reference clock can be gated if conditions so permit.

Figure 8:
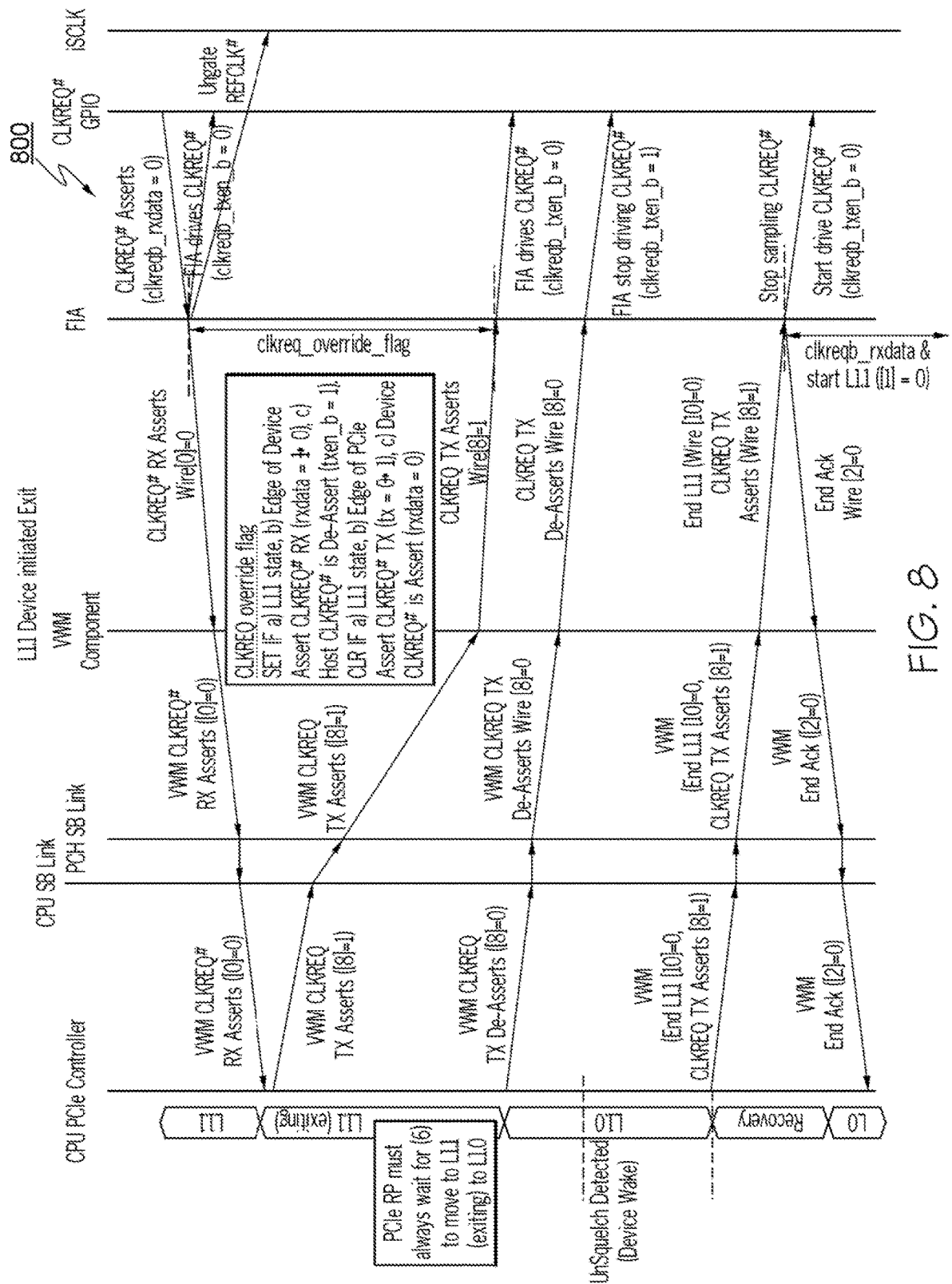
FIG. 8 is a swim lane diagram for a sample clock request protocol exit condition for an L1.1 sub-state in accordance with embodiments of the present disclosure.

FIG. 8 is a swim lane diagram for a sample clock request protocol exit condition for an L1.1 sub-state in accordance with embodiments of the present disclosure. FIG. 8 illustrates an example exit condition for L1.1 CLKREQ# Sample Protocol. When an attached PCIe device intends to exit L1.1 power management state, the attached PCIe device can assert a CLKREQ# GPIO pin. This GPIO pin can trigger the ICC to ungate the reference clock supply to the device. At the same time, the PCH FIA can convert the CLKREQ# GPIO pin to clock request messages by setting "CLKREQ# RX State Assert_b/Deassert_b" to assert. PCH FIA can also drive the CLKREQ# GPIO pin to assert, to prevent the device reentering to CLKREQ# deassert power management state. The CPU PCIe root port, upon receiving the clock request messages, can respond with clock request message of "CLKREQ TX Control Assert/Deassert" to assert.

This protocol can also handle simultaneous waking of host and device wake status, whereby a clock request message from the PCH to the CPU with "CLKREQ# RX State Assert_b/Deassert_b" assert can be sent simultaneously along with clock request message from CPU to PCH with "CLKREQ TX Control Assert/Deassert" to assert. When CPU PCIe root port eventually ready to exit L1.1 power management state, CPU PCIe root port will proceed sending clock request messaging with "Start/End L1.1 Protocol" to deassert along with "CLKREQ TX Control Assert/Deassert" to assert. PCH FIA in response will return the clock request message with "CLKREQ# RX State Assert_b/Deassert_b" to deassert and hence end the L1.1 CLKREQ# sample protocol.

Figure 9:
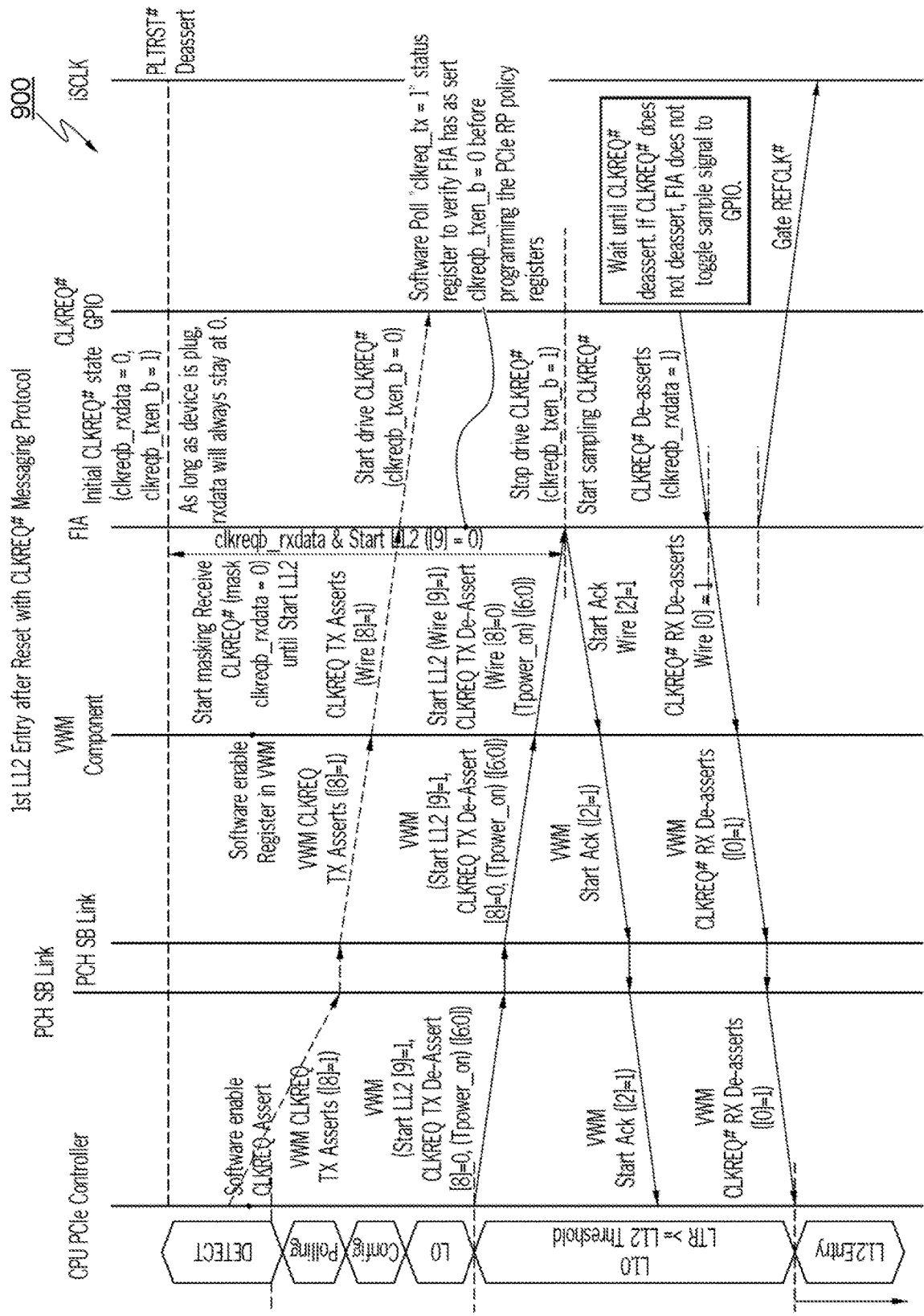
FIG. 9 is a swim lane diagram for a sample clock request protocol entry condition for an L1.2 sub-state in accordance with embodiments of the present disclosure.

FIG. 9 is a swim lane diagram for a sample clock request protocol entry condition for an L1.2 sub-state in accordance with embodiments of the present disclosure. The CLKREQ L1.2 sample protocol are similar to CLKREQ L1.1 sample protocol described above, except the PCIe specification permits the TX Common mode to be turned off. Therefore a series of turn on and turn off timers is required to be maintain by the attached PCIe device and PCIe root port. With this, CLKREQ L1.2 sample protocol required to additionally carries the timer information's to achieve power management.

When the CPU PCIe root port discovers that the root port and the attached device are capable of supporting L1 sub-state, and device advertise latency tolerate requirement (LTR) meeting the L1.2 LTR requirement, CPU PCIe root port will preparing the port to enter L1.2 whenever link entering to L1.0 state. As soon as link had entering to L1.0 state, CPU PCIe root port will send a clock request messages with "Start/End L1.2 Protocol" to assert, and at the same time with "CLKREQ TX Control Assert/Deassert" to deassert. Apart of that information, CPU PCIe root port also required to send "Tpower_on Scale" as well as "Power On Wait Time" on same clock request messages, so that the PCH FIA will have the information to count the Tpower on on behalf of CPU PCIe root port when device trigger an exit. As usual, the PCH FIA will then deassert the CLKREQ# GPIO pins, and at the same time respond with a clock request message of "Start/End Protocol ACK" assert. At the same time, the CLKREQ# GPIO pin status is carried on the "CLKREQ# RX State Assert_b/Deassert_b." As soon as CLKREQ# GPIO pin is deasserted, the PCH FIA can generate another clock request message with "CLKREQ# RX State Assert_b/Deassert_b" to deassert the GPIO pin to bring CPU PCIe root port into L1.2 state.

Figure 10A:
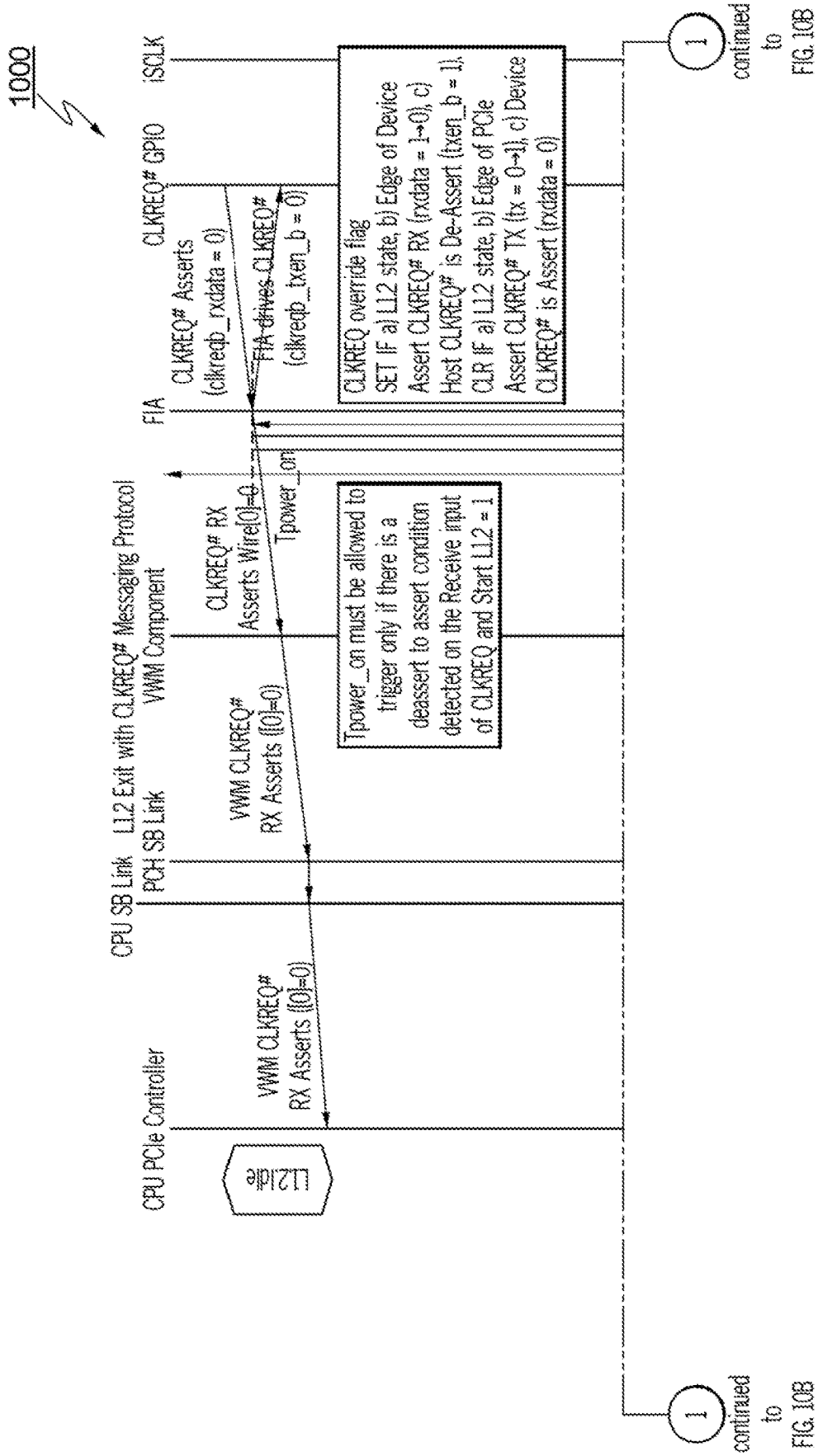
FIG. 10 is a swim lane diagram for a sample clock request protocol exit condition for an L1.2 sub-state in accordance with embodiments of the present disclosure.
Figure 10B:
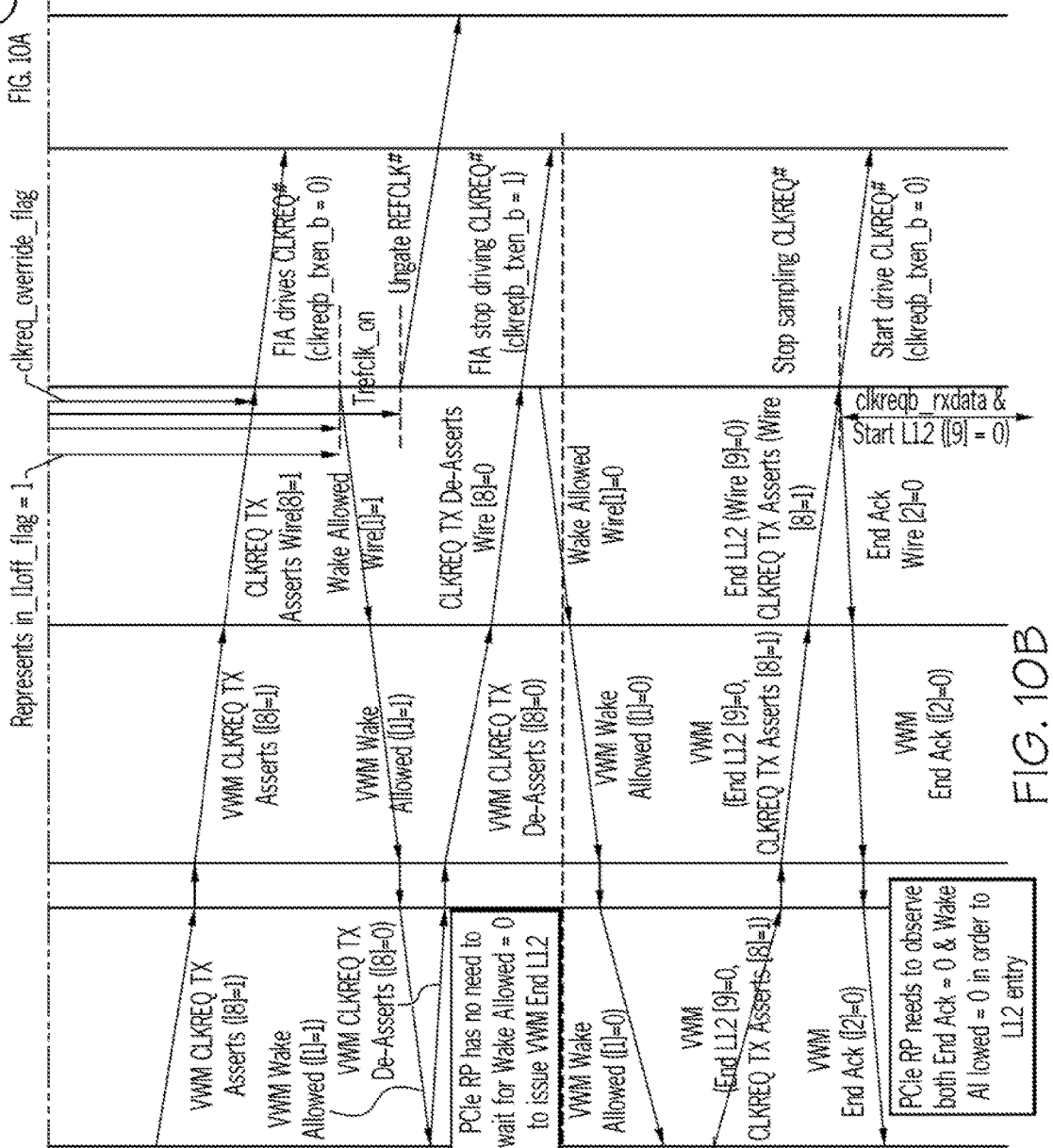

FIG. 10 is a swim lane diagram for a sample clock request protocol exit condition for an L1.2 sub-state in accordance with embodiments of the present disclosure. For L1.2 exit, when CLKREQ# GPIO pin is asserted, the PCH FIA will then send a clock request message with "CLKREQ# RX State Assert_b/Deassert_b" to assert. The CPU PCIe root port will then respond with clock request message with "CLKREQ TX Control Assert/Deassert" to assert, which serves as an acknowledgement of sampling the CLKREQ# GPIO pin assertion, and at the same time suppressing the device from demotion to a low power management state. The PCH FIA can send the clock request messages and also arm the Tpower_on timer. After the Tpower_on timer expires, the PCH FIA will send another clock request message with additional of "Wake Allowed" set to assert, which serves as indication to CPU PCIe root port that CPU PCIe root port can now exiting L1.2, and proceed with exit condition. During this time, CPU PCIe root port will send another clock request messages with "CLKREQ TX Control Assert/Deassert" to deassert and at the same time monitoring the rxelecidle exit condition for exiting L1.0. Purpose of sending clock request messages with "CLKREQ TX Control Assert/Deassert" to deassert is to allow device to demote back to L1 sub-state which is part of the feature that supported by PCIe L1 Substate ECN revision 0.7. When CPU PCIe root port detected a wake on link via rxelecidle deassertion, CPU PCIe root port will then terminate the clock request message protocol by sending clock request message with "Start/End L1.2 Protocol" to deassert and "CLKREQ TX Control Assert/Deassert" to assert. PCH FIA will then response with clock request messages with "Start/End Protocol ACK" to deassert.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 11:
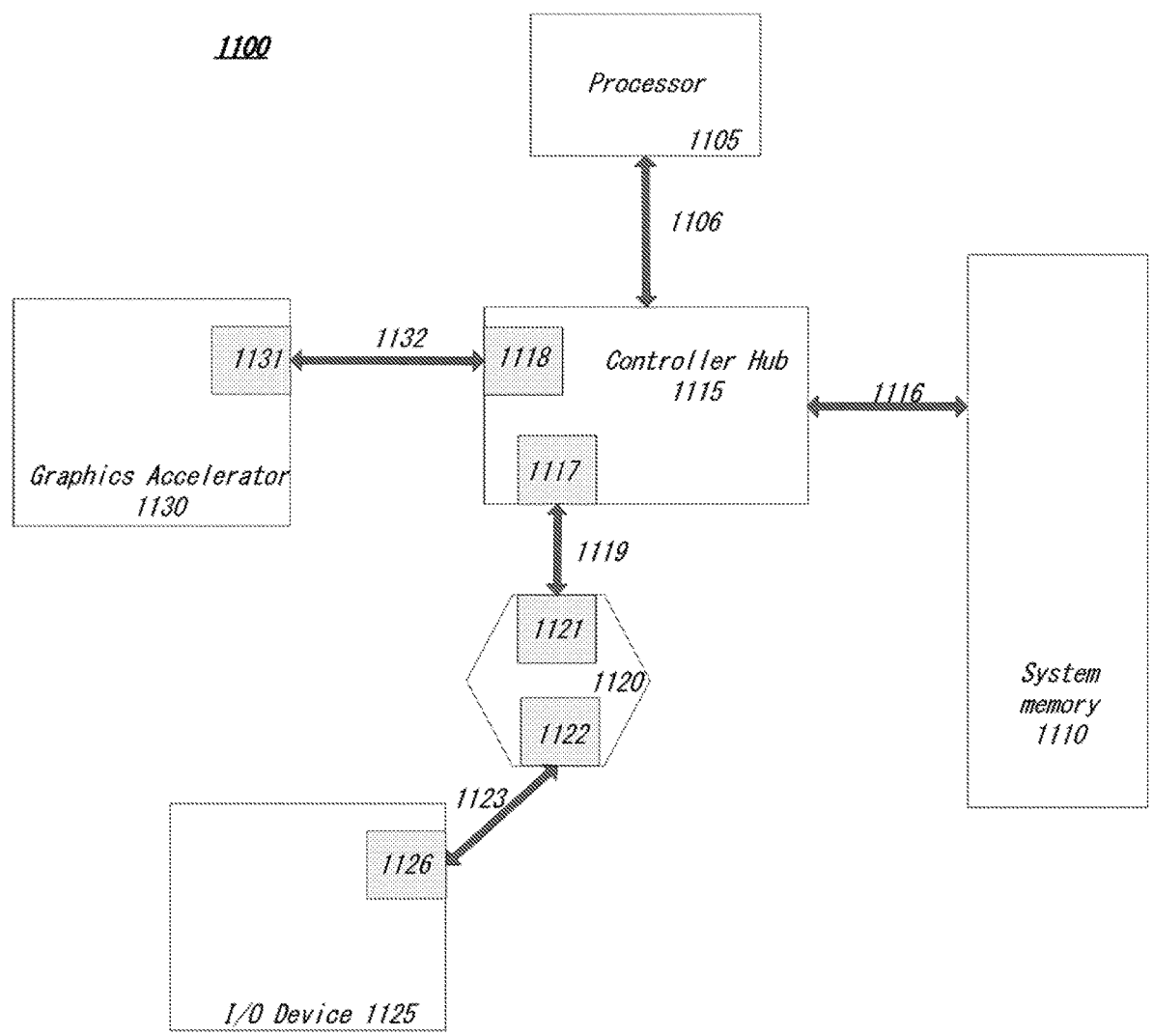
FIG. 11 illustrates an embodiment of a computing system including an interconnect architecture.

Referring to FIG. 11, an embodiment of a fabric composed of point-to-point Links that interconnect a set of components is illustrated. System 1100 includes processor 1105 and system memory 1110 coupled to controller hub 1115. Processor 1105 includes any processing element, such as a microprocessor, a host processor, an embedded processor, a co-processor, or other processor. Processor 1105 is coupled to controller hub 1115 through front-side bus (FSB) 1106. In one embodiment, FSB 1106 is a serial point-to-point interconnect as described below. In another embodiment, link 1106 includes a serial, differential interconnect architecture that is compliant with different interconnect standard.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 is a root hub, root complex, or root controller in a Peripheral Component Interconnect Express (PCIe or PCIE) interconnection hierarchy. Examples of controller hub 1115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 1120 through serial link 1119. Input/output modules 1117 and 1121, which may also be referred to as interfaces/ports 1117 and 1121, include/implement a layered protocol stack to provide communication between controller hub 1115 and switch 1120. In one embodiment, multiple devices are capable of being coupled to switch 1120.

Switch/bridge 1120 routes packets/messages from device 1125 upstream, i.e. up a hierarchy towards a root complex, to controller hub 1115 and downstream, i.e. down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1125 may include a PCIe to PCI/PCI-X bridge to support legacy or other version PCI devices. Endpoint devices in PCIe are often classified as legacy, PCIe, or root complex integrated endpoints.

Graphics accelerator 1130 is also coupled to controller hub 1115 through serial link 1132. In one embodiment, graphics accelerator 1130 is coupled to an MCH, which is coupled to an ICH. Switch 1120, and accordingly I/O device 1125, is then coupled to the ICH. I/O modules 1131 and 1118 are also to implement a layered protocol stack to communicate between graphics accelerator 1130 and controller hub 1115. Similar to the MCH discussion above, a graphics controller or the graphics accelerator 1130 itself may be integrated in processor 1105.

Figure 12:
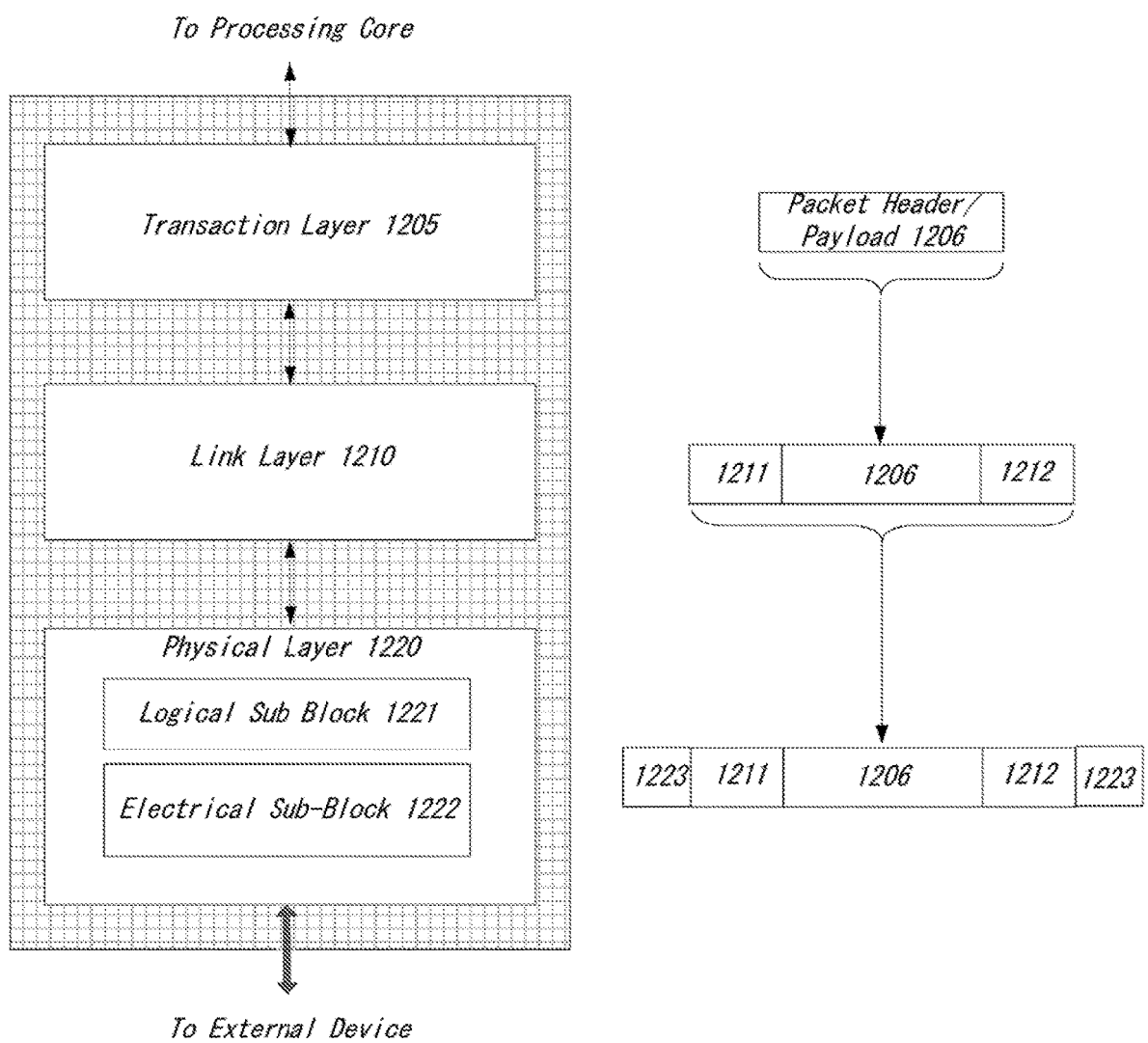
FIG. 12 illustrates an embodiment of a interconnect architecture including a layered stack.

Turning to FIG. 12 an embodiment of a layered protocol stack is illustrated. Layered protocol stack 1200 includes any form of a layered communication stack, such as a Quick Path Interconnect (QPI) stack, a PCIe stack, a next generation high performance computing interconnect stack, or other layered stack. Although the discussion immediately below in reference to FIGS. 11-14 are in relation to a PCIe stack, the same concepts may be applied to other interconnect stacks. In one embodiment, protocol stack 1200 is a PCIe protocol stack including transaction layer 1205, link layer 1210, and physical layer 1220. An interface, such as interfaces 1117, 1118, 1121, 1122, 1126, and 1131 in FIG. 1, may be represented as communication protocol stack 1200. Representation as a communication protocol stack may also be referred to as a module or interface implementing/including a protocol stack.

PCI Express uses packets to communicate information between components. Packets are formed in the Transaction Layer 1205 and Data Link Layer 1210 to carry the information from the transmitting component to the receiving component. As the transmitted packets flow through the other layers, they are extended with additional information necessary to handle packets at those layers. At the receiving side the reverse process occurs and packets get transformed from their Physical Layer 1220 representation to the Data Link Layer 1210 representation and finally (for Transaction Layer Packets) to the form that can be processed by the Transaction Layer 1205 of the receiving device.

Transaction Layer

In one embodiment, transaction layer 1205 is to provide an interface between a device's processing core and the interconnect architecture, such as data link layer 1210 and physical layer 1220. In this regard, a primary responsibility of the transaction layer 1205 is the assembly and disassembly of packets (i.e., transaction layer packets, or TLPs). The translation layer 1205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1205 assembles packet header/payload 1206. Format for current packet headers/payloads may be found in the PCIe specification at the PCIe specification website.

Figure 13:
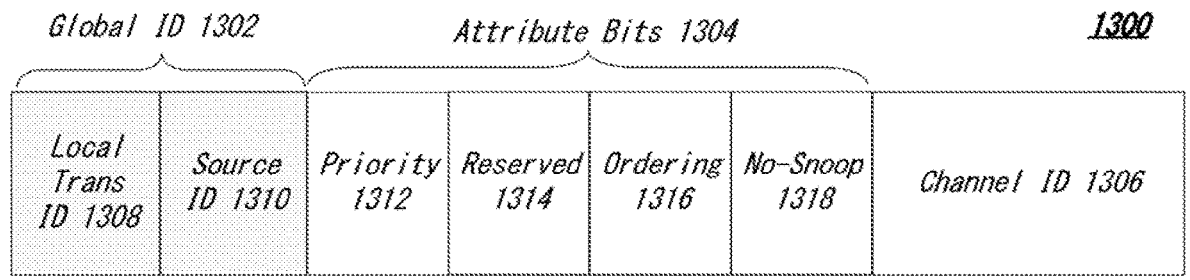
FIG. 13 illustrates an embodiment of a request or packet to be generated or received within an interconnect architecture.

Quickly referring to FIG. 13, an embodiment of a PCIe transaction descriptor is illustrated. In one embodiment, transaction descriptor 1300 is a mechanism for carrying transaction information. In this regard, transaction descriptor 1300 supports identification of transactions in a system. Other potential uses include tracking modifications of default transaction ordering and association of transaction with channels.

Transaction descriptor 1300 includes global identifier field 1302, attributes field 1304 and channel identifier field 1306. In the illustrated example, global identifier field 1302 is depicted comprising local transaction identifier field 1308 and source identifier field 1310. In one embodiment, global transaction identifier 1302 is unique for all outstanding requests.

According to one implementation, local transaction identifier field 1308 is a field generated by a requesting agent, and it is unique for all outstanding requests that require a completion for that requesting agent. Furthermore, in this example, source identifier 1310 uniquely identifies the requestor agent within a PCIe hierarchy. Accordingly, together with source ID 1310, local transaction identifier 1308 field provides global identification of a transaction within a hierarchy domain.

Attributes field 1304 specifies characteristics and relationships of the transaction. In this regard, attributes field 1304 is potentially used to provide additional information that allows modification of the default handling of transactions. In one embodiment, attributes field 1304 includes priority field 1312, reserved field 1314, ordering field 1316, and no-snoop field 1318. Here, priority sub-field 1312 may be modified by an initiator to assign a priority to the transaction. Reserved attribute field 1314 is left reserved for future, or vendor-defined usage. Possible usage models using priority or security attributes may be implemented using the reserved attribute field.

In this example, ordering attribute field 1316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1318 is utilized to determine if transactions are snooped. As shown, channel ID Field 1306 identifies a channel that a transaction is associated with.

Link Layer

Link layer 1210, also referred to as data link layer 1210, acts as an intermediate stage between transaction layer 1205 and the physical layer 1220. In one embodiment, a responsibility of the data link layer 1210 is providing a reliable mechanism for exchanging Transaction Layer Packets (TLPs) between two components a link. One side of the Data Link Layer 1210 accepts TLPs assembled by the Transaction Layer 1205, applies packet sequence identifier 1211, i.e. an identification number or packet number, calculates and applies an error detection code, i.e. CRC 1212, and submits the modified TLPs to the Physical Layer 1220 for transmission across a physical to an external device.

Physical Layer

In one embodiment, physical layer 1220 includes logical sub block 1221 and electrical sub-block 1222 to physically transmit a packet to an external device. Here, logical sub-block 1221 is responsible for the "digital" functions of Physical Layer 1221. In this regard, the logical sub-block includes a transmit section to prepare outgoing information for transmission by physical sub-block 1222, and a receiver section to identify and prepare received information before passing it to the Link Layer 1210.

Physical block 1222 includes a transmitter and a receiver. The transmitter is supplied by logical sub-block 1221 with symbols, which the transmitter serializes and transmits onto to an external device. The receiver is supplied with serialized symbols from an external device and transforms the received signals into a bit-stream. The bit-stream is de-serialized and supplied to logical sub-block 1221. In one embodiment, an 8b/10b transmission code is employed, where ten-bit symbols are transmitted/received. Here, special symbols are used to frame a packet with frames 1223. In addition, in one example, the receiver also provides a symbol clock recovered from the incoming serial stream.

As stated above, although transaction layer 1205, link layer 1210, and physical layer 1220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 14:
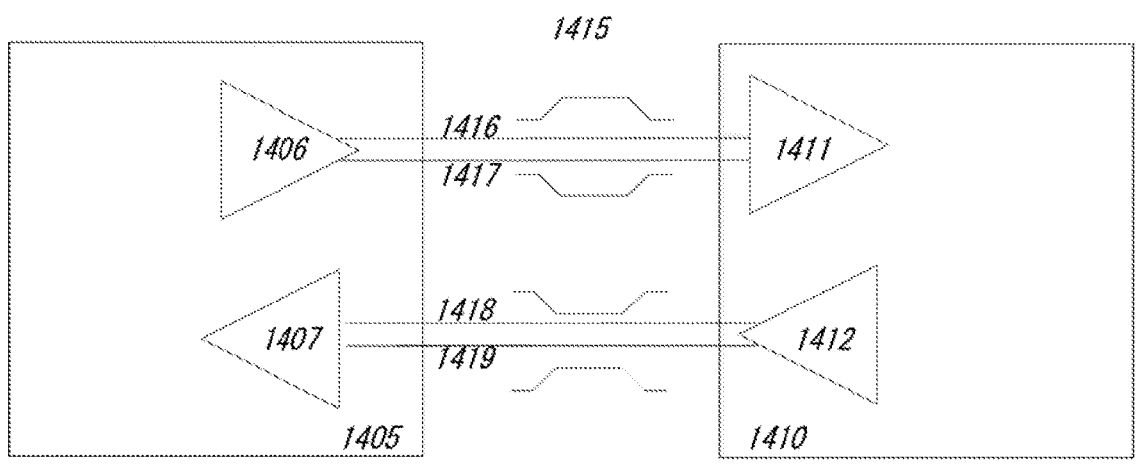
FIG. 14 illustrates an embodiment of a transmitter and receiver pair for an interconnect architecture.

Referring next to FIG. 14, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1406/1411 and a receive pair 1412/1407. Accordingly, device 1405 includes transmission logic 1406 to transmit data to device 1410 and receiving logic 1407 to receive data from device 1410. In other words, two transmitting paths, i.e. paths 1416 and 1417, and two receiving paths, i.e. paths 1418 and 1419, are included in a PCIe link.

A transmission path refers to any path for transmitting data, such as a transmission line, a copper line, an optical line, a wireless communication channel, an infrared communication link, or other communication path. A connection between two devices, such as device 1405 and device 1410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1416 and 1417, to transmit differential signals. As an example, when line 1416 toggles from a low voltage level to a high voltage level, i.e. a rising edge, line 1417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 15:
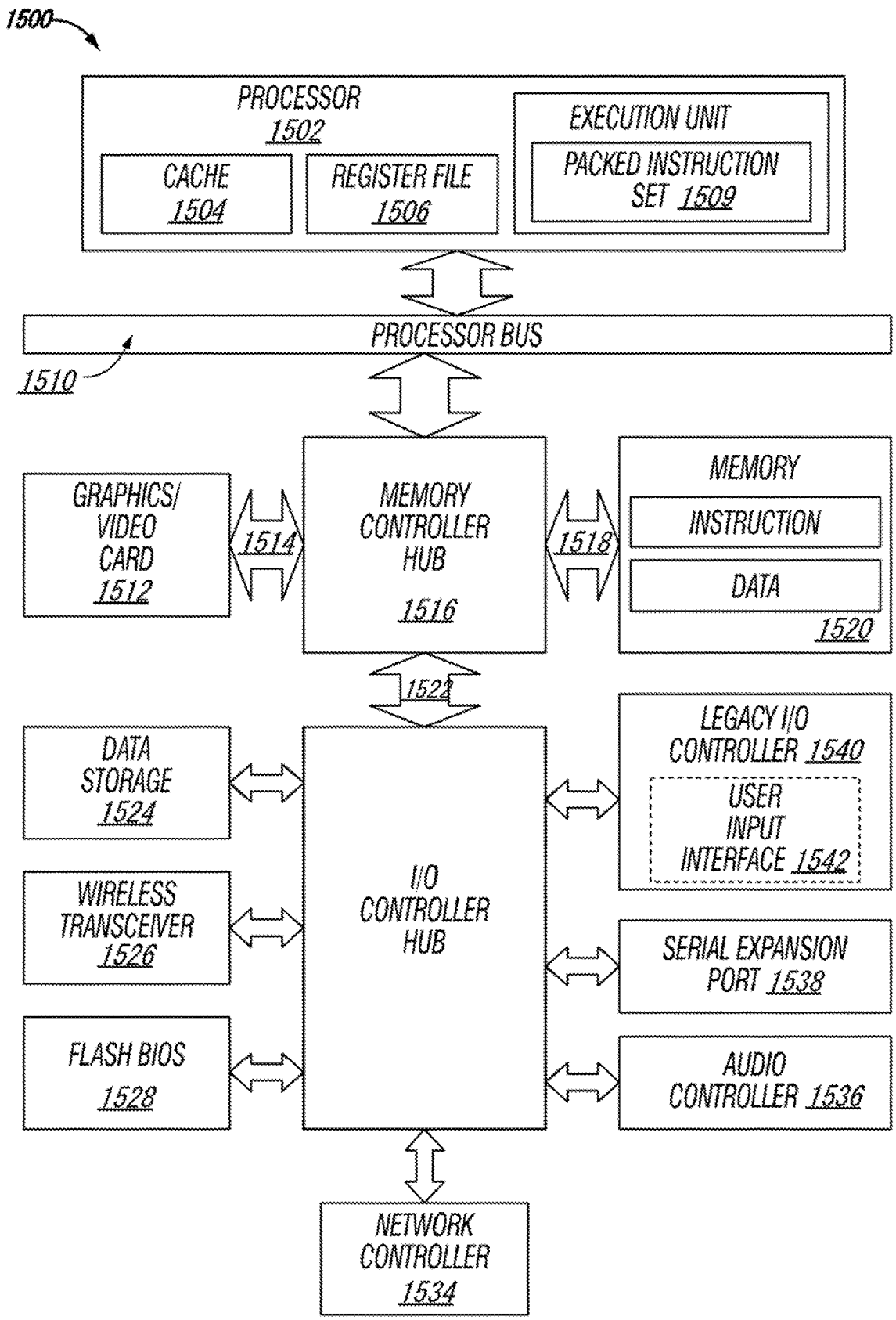
FIG. 15 illustrates another embodiment of a block diagram for a computing system including a processor.

Turning to FIG. 15, a block diagram of an exemplary computer system formed with a processor that includes execution units to execute an instruction, where one or more of the interconnects implement one or more features in accordance with one embodiment of the present invention is illustrated. System 1500 includes a component, such as a processor 1502 to employ execution units including logic to perform algorithms for process data, in accordance with the present invention, such as in the embodiment described herein. System 1500 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1500 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1502 includes one or more execution units 1508 to implement an algorithm that is to perform at least one instruction. One embodiment may be described in the context of a single processor desktop or server system, but alternative embodiments may be included in a multiprocessor system. System 1500 is an example of a 'hub' system architecture. The computer system 1500 includes a processor 1502 to process data signals. The processor 1502, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1502 is coupled to a processor bus 1510 that transmits data signals between the processor 1502 and other components in the system 1500. The elements of system 1500 (e.g. graphics accelerator 1512, memory controller hub 1516, memory 1520, I/O controller hub 1524, wireless transceiver 1526, Flash BIOS 1528, Network controller 1534, Audio controller 1536, Serial expansion port 1538, I/O controller 1540, etc.) perform their conventional functions that are well known to those familiar with the art.

In one embodiment, the processor 1502 includes a Level 1 (L1) internal cache memory 1504. Depending on the architecture, the processor 1502 may have a single internal cache or multiple levels of internal caches. Other embodiments include a combination of both internal and external caches depending on the particular implementation and needs. Register file 1506 is to store different types of data in various registers including integer registers, floating point registers, vector registers, banked registers, shadow registers, checkpoint registers, status registers, and instruction pointer register.

Execution unit 1508, including logic to perform integer and floating point operations, also resides in the processor 1502. The processor 1502, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1502. For one embodiment, execution unit 1508 includes logic to handle a packed instruction set 1509. By including the packed instruction set 1509 in the instruction set of a general-purpose processor 1502, along with associated circuitry to execute the instructions, the operations used by many multimedia applications may be performed using packed data in a general-purpose processor 1502. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1508 may also be used in micro controllers, embedded processors, graphics devices, DSPs, and other types of logic circuits. System 1500 includes a memory 1520. Memory 1520 includes a dynamic random access memory (DRAM) device, a static random access memory (SRAM) device, flash memory device, or other memory device. Memory 1520 stores instructions and/or data represented by data signals that are to be executed by the processor 1502.

Note that any of the aforementioned features or aspects of the invention may be utilized on one or more interconnect illustrated in FIG. 15. For example, an on-die interconnect (ODI), which is not shown, for coupling internal units of processor 1502 implements one or more aspects of the invention described above. Or the invention is associated with a processor bus 1510 (e.g. Intel Quick Path Interconnect (QPI) or other known high performance computing interconnect), a high bandwidth memory path 1518 to memory 1520, a point-to-point link to graphics accelerator 1512 (e.g. a Peripheral Component Interconnect express (PCIe) compliant fabric), a controller hub interconnect 1522, an I/O or other interconnect (e.g. USB, PCI, PCIe) for coupling the other illustrated components. Some examples of such components include the audio controller 1536, firmware hub (flash BIOS) 1528, wireless transceiver 1526, data storage 1524, legacy I/O controller 1510 containing user input and keyboard interfaces 1542, a serial expansion port 1538 such as Universal Serial Bus (USB), and a network controller 1534. The data storage device 1524 can comprise a hard disk drive, a floppy disk drive, a CD-ROM device, a flash memory device, or other mass storage device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 is a method for managing power of a connected device, the method including transmitting, from a central processing unit (CPU) root port, to a platform controller hub (PCH) compliant with a Peripheral Component Interconnect Express (PCIe) protocol, a first clock request message, the first clock request message comprising a first bit set to assert a clock request transmit (CLKREQ TX assert) on a 3.3 volt general purpose input/output (GPIO) pin local to the PCH; detecting that a connected device is entering into a power management state; and transmitting, from the CPU root port, to the PCH, a second clock request message, the second clock request message comprising the first bit set to deassert the clock request transmit (CLKREQ TX deassert) and a second bit to assert a clock request protocol (CLKREQ#) on a 3.3 volt GPIO pin.

Example 2 may include the subject matter of example claim 1, wherein the second bit of the second clock request message comprises an asserted clock request no sample protocol bit for a power management state that does not require clock request sampling.

Example 3 may include the subject matter of example 2, and may also include transmitting, from the CPU to the PCH a third clock request message, the third clock request message comprising a first bit set to assert a clock request transmit (CLKREQ TX assert) on a 3.3 volt general purpose input/output (GPIO) pin local to the PCH and a second bit set to deassert the clock request no sample protocol.

Example 4 may include the subject matter of any of examples 1-3, wherein the second bit of the second clock request message comprises an asserted clock request sample protocol bit for a power management state that uses clock request sampling.

Example 5 may include the subject matter of example 4, and can also include, for a deasserted 3.3 volt GPIO pin, performing power management of a connected device.

Example 6 may include the subject matter of example 5, wherein the CPU receives a clock request message receive state assert_b/deassert_b message indicating that the 3.3 volt GPIO pin is deasserted.

Example 7 may include the subject matter of example 4, wherein the power management state comprises a detect state for a hot plug protocol.

Example 8 may include the subject matter of any of examples 1-3, wherein the CPU is in an L1.0 power management state, and wherein the second bit of the second clock request message comprises an asserted bit to start an L1.1 protocol.

Example 9 may include the subject matter of example 8, and can also include receiving from the PCH a clock request message; and entering into an L1.1 state from the L1.0 state.

Example 10 may include the subject matter of any of examples 1-3, and can also include determining that an attached device supports an L1.2 power management state; wherein the second bit of the second clock request message comprises a start/end L1.2 protocol bit set, and the second clock request message further comprising a third bit indicating a Tpower_on Scale and a fourth bit indicating a Power On Wait Time bit.

Example 11 is a computing system that includes a central processing unit (CPU); and a root port complex implemented at least partially in hardware and compliant with a Peripheral Component Interconnect Express (PCIe) protocol, the root port complex local to and connected to the CPU, the root port complex to transmit to a platform controller hub (PCH) compliant with a Peripheral Component Interconnect Express (PCIe) protocol, a first clock request message, the first clock request message comprising a first bit set to assert a clock request transmit (CLKREQ TX assert) on a 3.3 volt general purpose input/output (GPIO) pin local to the PCH; detect that a connected device is entering into a power management state; and transmit to the PCH, a second clock request message, the second clock request message comprising the first bit set to deassert the clock request transmit (CLKREQ TX deassert) and a second bit to assert a clock request protocol (CLKREQ#) on a 3.3 volt GPIO pin.

Example 12 may include the subject matter of example 11, wherein the second bit of the second clock request message comprises an asserted clock request no sample protocol bit for a power management state that does not require clock request sampling.

Example 13 may include the subject matter of example 12, the root port complex to transmit, from the CPU to the PCH a third clock request message, the third clock request message comprising a first bit set to assert a clock request transmit (CLKREQ TX assert) on a 3.3 volt general purpose input/output (GPIO) pin local to the PCH and a second bit set to deassert the clock request no sample protocol.

Example 14 may include the subject matter of any of examples 11-13, wherein the second bit of the second clock request message comprises an asserted clock request sample protocol bit for a power management state that uses clock request sampling.

Example 15 may include the subject matter of example 14, the root port complex to, for a deasserted 3.3 volt GPIO pin, perform power management of a connected device.

Example 16 may include the subject matter of example 15, wherein the CPU receives a clock request message receive state assert_b/deassert_b message indicating that the 3.3 volt GPIO pin is deasserted.

Example 17 may include the subject matter of example 14, wherein the power management state comprises a detect state for a hot plug protocol.

Example 18 may include the subject matter of any of examples 11-13, wherein the CPU is in an L1.0 power management state, and wherein the second bit of the second clock request message comprises an asserted bit to start an L1.1 protocol.

Example 19 may include the subject matter of example 18, the root port complex to receive from the PCH a clock request message; and enter into an L1.1 state from the L1.0 state.

Example 20 may include the subject matter of any of examples 11-13, the root port complex to determine that an attached device supports an L1.2 power management state; wherein the second bit of the second clock request message comprises a start/end L1.2 protocol bit set, and the second clock request message further comprising a third bit indicating a Tpower_on Scale and a fourth bit indicating a Power On Wait Time bit.

Example 21 is a platform controller hub (PCH) compliant with the PCIe protocol coupled to the root port complex across a sideband network, the PCH comprising a general purpose input/output (GPIO) circuit comprising a 3.3 volt pin; the PCH comprising logic to cause the 3.3 volt pin of the GPIO to enter into an asserted state; receive, from a central processing unit (CPU) root port a first clock request message, the first clock request message comprising a first bit set to assert a clock request transmit (CLKREQ TX assert) on a 3.3 volt general purpose input/output (GPIO) pin local to the PCH; receive a second clock request message, the second clock request message comprising the first bit set to deassert the clock request transmit (CLKREQ TX deassert) and a second bit to assert a clock request protocol (CLKREQ#) on a 3.3 volt GPIO pin; and cause a connected device to enter into a power management state.

Example 22 may include the subject matter of example 21, the PCH including logic to transmit an acknowledgement message to the CPU root port; and deassert the 3.3 volt GPIO pin.

Example 23 may include the subject matter of example 21, the PCH including logic to receive an indication from the CPU root port of an awakening from a power management state; transmit a clock request received state message to the CPU root port; suppress the 3.3 volt GPIO pin from being asserted to prevent an attached device from entering into a power management state; and transmit to the CPU root port a clock request message comprising a bit set to deassert the power management state.

Example may include the subject matter of example 21, the PCH including logic to receive an indication from the CPU root port to cause an attached device to enter into an L1.1 power management sub-state; activate an L1.1 power management protocol; deassert the 3.3 volt GPIO pin; and cause the attached device to enter an L1.1 power management state.

Example 25 may include the subject matter of example 21, the PCH including logic to receive an indication from the CPU root port to cause an attached device to enter into an L1.1 power management sub-state; activate an L1.2 power management protocol; deassert the 3.3 volt GPIO pin; and cause the attached device to enter an L1.2 power management state.

Example 26 is a method performed by a platform controller hub (PCH), the method including causing a 3.3 volt pin of a GPIO to enter into an asserted state; receive, from a central processing unit (CPU) root port a first clock request message, the first clock request message comprising a first bit set to assert a clock request transmit (CLKREQ TX assert) on the 3.3 volt general purpose input/output (GPIO) pin local to the PCH; receiving a second clock request message, the second clock request message comprising the first bit set to deassert the clock request transmit (CLKREQ TX deassert) and a second bit to assert a clock request protocol (CLKREQ#) on a 3.3 volt GPIO pin; and causing a connected device to enter into a power management state.

Example 27 may include the subject matter of example 26 and may also include transmitting an acknowledgement message to the CPU root port; and deasserting the 3.3 volt GPIO pin.

Example 28 may include the subject matter of example 26 and may also include receiving an indication from the CPU root port of an awakening from a power management state; transmitting a clock request received state message to the CPU root port; suppressing the 3.3 volt GPIO pin from being asserted to prevent an attached device from entering into a power management state; and transmitting to the CPU root port a clock request message comprising a bit set to deassert the power management state.

Example 29 may include the subject matter of example and can also include receiving an indication from the CPU root port to cause an attached device to enter into an L1.1 power management sub-state; activating an L1.1 power management protocol; deasserting the 3.3 volt GPIO pin; and causing the attached device to enter an L1.1 power management state.

Example 30 may include the subject matter of example 26 and can also include receiving an indication from the CPU root port to cause an attached device to enter into an L1.1 power management sub-state; activating an L1.2 power management protocol; deasserting the 3.3 volt GPIO pin; and causing the attached device to enter an L1.2 power management state.

Example 31 is a computer program product tangibly embodied on non-transitory computer-readable media, the computer program product comprising code that when executed cause a root port to transmit to a platform controller hub (PCH) compliant with a Peripheral Component Interconnect Express (PCIe) protocol, a first clock request message, the first clock request message comprising a first bit set to assert a clock request transmit (CLKREQ TX assert) on a 3.3 volt general purpose input/output (GPIO) pin local to the PCH; detect that a connected device is entering into a power management state; and transmit to the PCH, a second clock request message, the second clock request message comprising the first bit set to deassert the clock request transmit (CLKREQ TX deassert) and a second bit to assert a clock request protocol (CLKREQ#) on a 3.3 volt GPIO pin.

Example 32 may include the subject matter of example 31, wherein the second bit of the second clock request message comprises an asserted clock request no sample protocol bit for a power management state that does not require clock request sampling.

Example 33 may include the subject matter of example 32, wherein the code, when executed, causes the root port to transmitting, from the CPU to the PCH a third clock request message, the third clock request message comprising a first bit set to assert a clock request transmit (CLKREQ TX assert) on a 3.3 volt general purpose input/output (GPIO) pin local to the PCH and a second bit set to deassert the clock request no sample protocol.

Example 34 may include the subject matter of example 31, wherein the second bit of the second clock request message comprises an asserted clock request sample protocol bit for a power management state that uses clock request sampling.

Example 35 may include the subject matter of example 34, wherein the code, when executed, causes the root port to for a deasserted 3.3 volt GPIO pin, perform power management of a connected device.

Example 36 may include the subject matter of example 35, wherein the root port receives a clock request message receive state assert_b/deassert_b message indicating that the 3.3 volt GPIO pin is deasserted.

Example 37 may include the subject matter of example 34, wherein the power management state comprises a detect state for a hot plug protocol.

Example 38 may include the subject matter of example 31, wherein the CPU is in an L1.0 power management state, and wherein the second bit of the second clock request message comprises an asserted bit to start an L1.1 protocol.

Example 39 may include the subject matter of example 38, wherein the code, when executed, causes the root port to receive from the PCH a clock request message; and enter into an L1.1 state from the L1.0 state.

Example 40 may include the subject matter of example 31, wherein the code, when executed, causes the root port to determining that an attached device supports an L1.2 power management state; wherein the second bit of the second clock request message comprises a start/end L1.2 protocol bit set, and the second clock request message further comprising a third bit indicating a Tpower_on Scale and a fourth bit indicating a Power On Wait Time bit.

Example 41 is a computer program product tangibly embodied on non-transitory computer-readable media, the computer program product comprising code that when executed cause a platform controller hub (PCH) compliant with a Peripheral Component Interconnect Express (PCIe) protocol to cause the 3.3 volt pin of the GPIO to enter into an asserted state; receive, from a central processing unit (CPU) root port a first clock request message, the first clock request message comprising a first bit set to assert a clock request transmit (CLKREQ TX assert) on a 3.3 volt general purpose input/output (GPIO) pin local to the PCH; receive a second clock request message, the second clock request message comprising the first bit set to deassert the clock request transmit (CLKREQ TX deassert) and a second bit to assert a clock request protocol (CLKREQ#) on a 3.3 volt GPIO pin; and cause a connected device to enter into a power management state.

Example 42 may include the subject matter of example 41, code, when executed, causes the PCH to transmit an acknowledgement message to the CPU root port; and deassert the 3.3 volt GPIO pin.

Example 43 may include the subject matter of example 41, code, when executed, causes the PCH to receive an indication from the CPU root port of an awakening from a power management state; transmit a clock request received state message to the CPU root port; suppress the 3.3 volt GPIO pin from being asserted to prevent an attached device from entering into a power management state; and transmit to the CPU root port a clock request message comprising a bit set to deassert the power management state.

Example 44 may include the subject matter of example 41, code, when executed, causes the PCH to receive an indication from the CPU root port to cause an attached device to enter into an L1.1 power management sub-state; activate an L1.1 power management protocol; deassert the 3.3 volt GPIO pin; and cause the attached device to enter an L1.1 power management state.

Example 45 may include the subject matter of example 41, code, when executed, causes the PCH to receive an indication from the CPU root port to cause an attached device to enter into an L1.1 power management sub-state; activate an L1.2 power management protocol; deassert the 3.3 volt GPIO pin; and cause the attached device to enter an L1.2 power management state.

What is claimed is:
1. A method for managing power of a connected device, the method comprising:
  transmitting, from a central processing unit (CPU) root port, to a platform controller hub (PCH) compliant with a Peripheral Component Interconnect Express (PCIe) protocol, a first clock request message, the first clock request message comprising a first bit set to assert a clock request transmit (CLKREQ TX assert) on a 3.3 volt general purpose input/output (GPIO) pin local to the PCH;

detecting that a connected device is entering into a power management state; and transmitting, from the CPU root port, to the PCH, a second clock request message, the second clock request message comprising the first bit set to deassert the clock request transmit (CLKREQ TX deassert) and a second bit to assert a clock request protocol (CLKREQ#) on a 3.3 volt GPIO pin.

2. The method of claim 1, wherein the second bit of the second clock request message comprises an asserted clock request no sample protocol bit for a power management state that does not require clock request sampling.

3. The method of claim 2, further comprising:

transmitting, from the CPU to the PCH a third clock request message, the third clock request message comprising a first bit set to assert a clock request transmit (CLKREQ TX assert) on a 3.3 volt general purpose input/output (GPIO) pin local to the PCH and a second bit set to deassert the clock request no sample protocol.

4. The method of claim 1, wherein the second bit of the second clock request message comprises an asserted clock request sample protocol bit for a power management state that uses clock request sampling.

5. The method of claim 4, further comprising, for a deasserted 3.3 volt GPIO pin, performing power management of a connected device.

6. The method of claim 5, wherein the CPU receives a clock request message receive state assert_b/deassert_b message indicating that the 3.3 volt GPIO pin is deasserted.

7. The method of claim 4, wherein the power management state comprises a detect state for a hot plug protocol.

8. The method of claim 1, wherein the CPU is in an L1.0 power management state, and wherein the second bit of the second clock request message comprises an asserted bit to start an L1.1 protocol.

9. The method of claim 8, further comprising:

receiving from the PCH a clock request message; and entering into an L1.1 state from the L1.0 state.

10. The method of claim 1, further comprising:

determining that an attached device supports an L1.2 power management state; and wherein the second bit of the second clock request message comprises a start/end L1.2 protocol bit set, and the second clock request message further comprising a third bit indicating a Tpower_on Scale and a fourth bit indicating a Power On Wait Time bit.

11. A computing system comprising:

a central processing unit (CPU); and a root port complex compliant with a Peripheral Component Interconnect Express (PCIe) protocol, the root port complex local to and connected to the CPU, the root port complex to:

transmit to a platform controller hub (PCH) compliant with a Peripheral Component Interconnect Express (PCIe) protocol, a first clock request message, the first clock request message comprising a first bit set to assert a clock request transmit (CLKREQ TX assert) on a 3.3 volt general purpose input/output (GPIO) pin local to the PCH;

detect that a connected device is entering into a power management state; and transmit to the PCH, a second clock request message, the second clock request message comprising the first bit set to deassert the clock request transmit (CLKREQ TX deassert) and a second bit to assert a clock request protocol (CLKREQ#) on a 3.3 volt GPIO pin.

12. The computing system of claim 11, wherein the second bit of the second clock request message comprises an asserted clock request no sample protocol bit for a power management state that does not require clock request sampling.

13. The computing system of claim 12, the root port complex to:

transmit, from the CPU to the PCH a third clock request message, the third clock request message comprising a first bit set to assert a clock request transmit (CLKREQ TX assert) on a 3.3 volt general purpose input/output (GPIO) pin local to the PCH and a second bit set to deassert the clock request no sample protocol.

14. The computing system of claim 11, wherein the second bit of the second clock request message comprises an asserted clock request sample protocol bit for a power management state that uses clock request sampling.

15. The computing system of claim 14, the root port complex to, for a deasserted 3.3 volt GPIO pin, perform power management of a connected device.

16. The computing system of claim 15, wherein the root port complex receives a clock request message receive state assert_b/deassert_b message indicating that the 3.3 volt GPIO pin is deasserted.

17. The computing system of claim 14, wherein the power management state comprises a detect state for a hot plug protocol.

18. The computing system of claim 11, wherein the CPU is in an L1.0 power management state, and wherein the second bit of the second clock request message comprises an asserted bit to start an L1.1 protocol.

19. The computing system of claim 18, the root port complex to:

receive from the PCH a clock request message; and enter into an L1.1 state from the L1.0 state.

20. The computing system of claim 11, the root port complex to:

determine that an attached device supports an L1.2 power management state; and wherein the second bit of the second clock request message comprises a start/end L1.2 protocol bit set, and the second clock request message further comprising a third bit indicating a Tpower_on Scale and a fourth bit indicating a Power On Wait Time bit.

21. A platform controller hub (PCH) compliant with a Peripheral Component Interconnect Express (PCIe) protocol coupled to the root port complex across a sideband network, the PCH comprising a general purpose input/output (GPIO) circuit comprising a 3.3 volt pin; the PCH comprising logic to:

cause the 3.3 volt pin of the GPIO circuit to enter into an asserted state;

receive, from a central processing unit (CPU) root port a first clock request message, the first clock request message comprising a first bit set to assert a clock request transmit (CLKREQ TX assert) on a 3.3 volt general purpose input/output (GPIO) pin local to the PCH;

receive a second clock request message, the second clock request message comprising the first bit set to deassert the clock request transmit (CLKREQ TX deassert) and a second bit to assert a clock request protocol (CLKREQ#) on a 3.3 volt GPIO pin; and cause a connected device to enter into a power management state.

22. The PCH of claim 21, the PCH comprising logic to:
transmit an acknowledgement message to the CPU root port; and
deassert the 3.3 volt GPIO pin.

23. The PCH of claim 21, the PCH comprising logic to:
receive an indication from the CPU root port of an awakening from a power management state;
transmit a clock request received state message to the CPU root port; and
suppress the 3.3 volt GPIO pin from being asserted to prevent an attached device from entering into a power management state; and
transmit to the CPU root port a clock request message comprising a bit set to deassert the power management state.

24. The PCH of claim 21, the PCH comprising logic to:
receive an indication from the CPU root port to cause an attached device to enter into an L1.1 power management sub-state;
activate an L1.1 power management protocol;
deassert the 3.3 volt GPIO pin; and
cause the attached device to enter an L1.1 power management state.

25. The PCH of claim 21, the PCH comprising logic to:
receive an indication from the CPU root port to cause an attached device to enter into an L1.1 power management sub-state;
activate an L1.2 power management protocol;
deassert the 3.3 volt GPIO pin; and
cause the attached device to enter an L1.2 power management state.

* * * * *